United States Patent [19]

Satomura

[11] Patent Number: 5,764,608
[45] Date of Patent: Jun. 9, 1998

[54] INFORMATION RECORDING-REPRODUCING APPARATUS

[75] Inventor: Seiichirou Satomura, Kawasaki, Japan

[73] Assignee: Canon Kabushiki Kaisha, Tokyo, Japan

[21] Appl. No.: 499,544

[22] Filed: Jul. 6, 1995

[30] Foreign Application Priority Data

Jul. 6, 1994 [JP] Japan ................................. 6-154681

[51] Int. Cl.⁶ .................................................. G11B 5/09
[52] U.S. Cl. ........................... 369/48; 369/59; 360/32
[58] Field of Search ............................. 369/47, 48, 50, 369/54, 58, 59, 124; 360/32, 39, 40, 41, 48, 51

[56] References Cited

U.S. PATENT DOCUMENTS 5,392,270  2/1995  Okada et al. ........................... 369/59

Primary Examiner—Paul W. Huber
Attorney, Agent, or Firm—Fitzpatrick, Cella, Harper & Scinto

[57] ABSTRACT

In an information recording-reproducing apparatus for recording and/or reproducing data on an information recording data on medium, the data recorded from the recording data on medium is reproduced by utilization of partial response. The data for each predetermined block is modulated and recorded such that during waveform equalization in the partial response, the number of a plurality of level values present in L samples corresponding to one block of the data may become constant in each block.

2 Claims, 27 Drawing Sheets

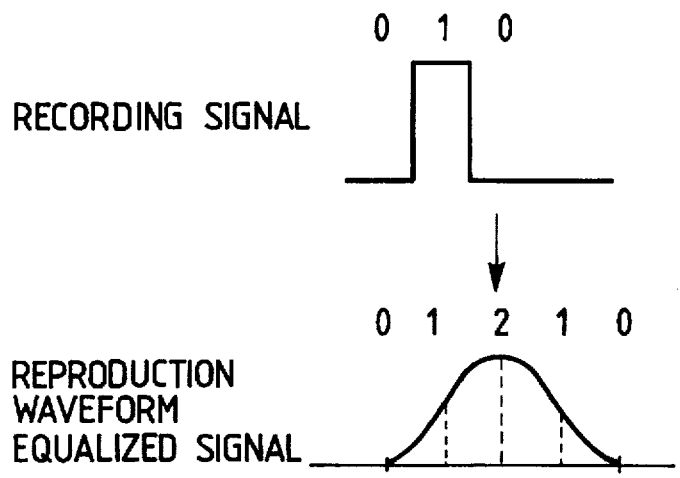
FIG. 3A PRIOR ART — RECORDING SIGNAL
FIG. 3B PRIOR ART — REPRODUCTION WAVEFORM EQUALIZED SIGNAL
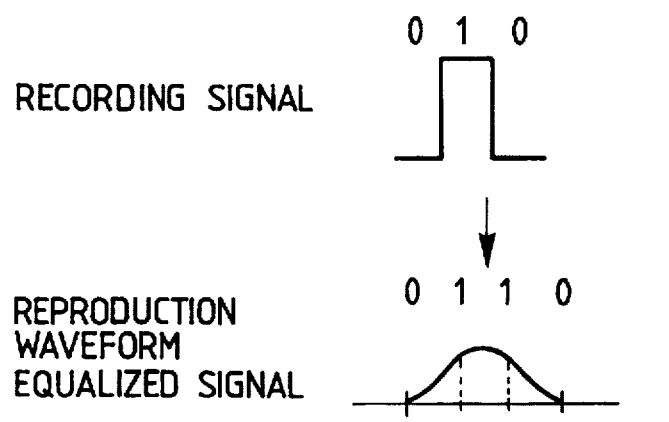
FIG. 6A PRIOR ART — RECORDING SIGNAL
FIG. 6B PRIOR ART — REPRODUCTION WAVEFORM EQUALIZED SIGNAL

FIG. 5
PRIOR ART

```
                (a) RECORDING DATA              0 1 1 0 0 1 0 1 0 0 0 · · ·

┌─ (b) NRZI CONVERSION 1              0 1 0 0 0 1 1 0 0 0 0 · · ·
PRECODER ┤
         └─ (c) NRZI CONVERSION 2              0 1 1 1 1 0 1 1 1 1 1 · · ·
                    (RECORDING SIGNAL)

1 2 1       1 2 1
                    WAVEFORM   ┌                     1 2 1       1 2 1
                  INTERFERENCE ┤                       1 2 1       1 2 1
                               └                         1 2 1       1 2 1
                                                ─────────────────────────────
                (e) QUINARY REPRODUC-           0 1 3 4 4 3 2 3 4 4 4 · · ·
                    TION SIGNAL
                                                 0 ⎫
                (f) BINARIZATION                 2 ⎬ → 0
                                                 4 ⎭

1 ⎫
                                                 3 ⎬ → 1

0 1 1 0 0 1 0 1 0 0 0 · · ·
```

FIG. 7
PRIOR ART (a) RECORDING DATA          0 1 1 0 0 1 0 1 0 0 0 · · ·

(c) NRZI CONVERSION      0 1 0 0 0 1 1 0 0 0 0 · · ·
    (PRECODE)
    (RECORDING SIGNAL)

WAVEFORM          1 1     1 1
    INTERFERENCE               1 1

(e) TERNARY              0 1 1 0 0 1 2 1 0 0 0 · · ·
    REPRODUCTION
    SIGNAL (f) BINARIZATION    $\begin{matrix}0\\2\end{matrix} \} \rightarrow 0$ $1 \rightarrow 1$    0 1 1 0 0 1 0 1 0 0 0 · · ·

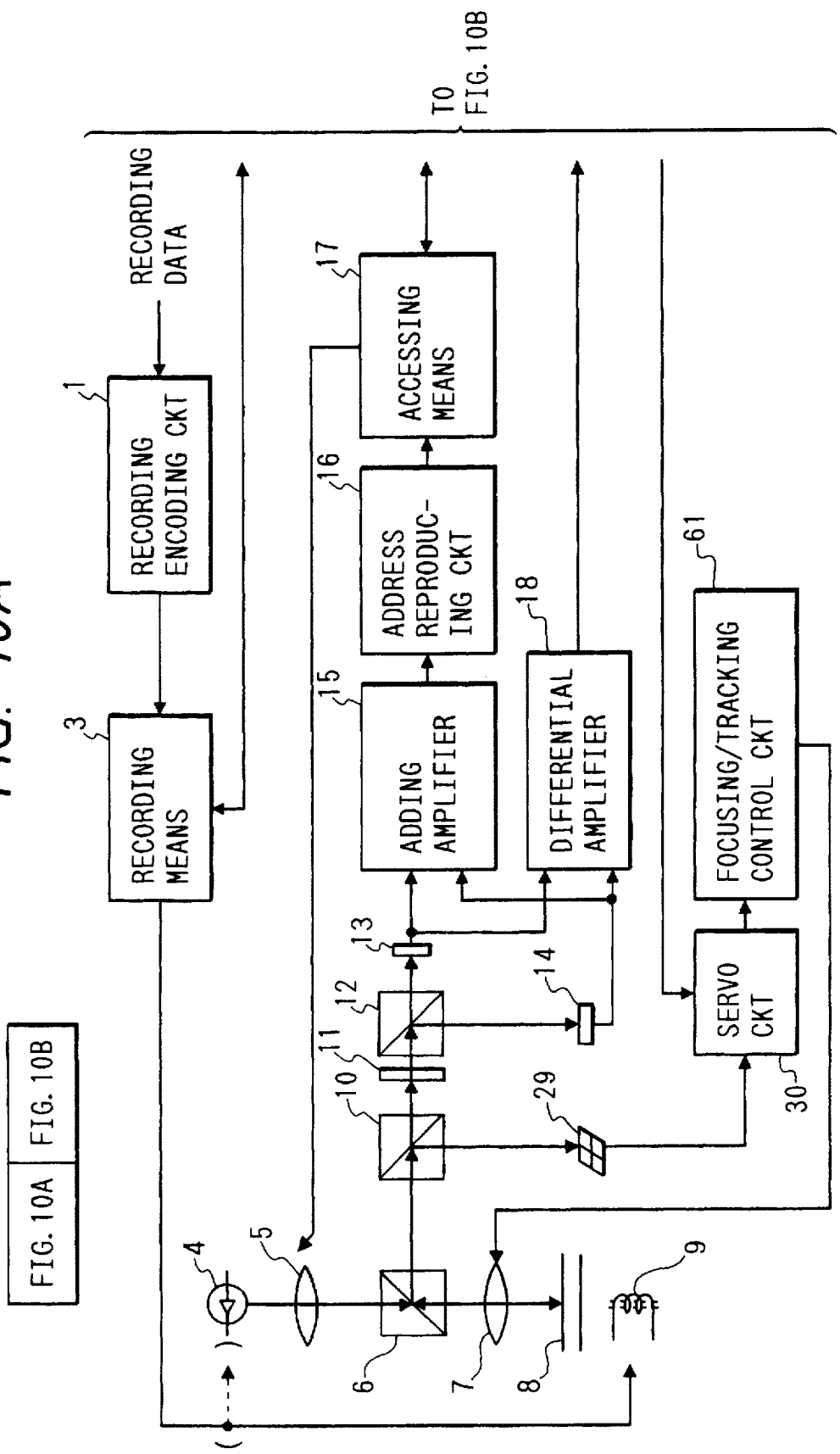

FIG. 12

| | (a) | (b) | | (a) | (b) |
|---|---|---|---|---|---|
| ( 1) | 0000101011110 | 0000111110001 | ( 66) | 0011000110110 | 0010100101101 |
| ( 2) | 0000101101110 | 0000111011001 | ( 67) | 0011000111010 | 0010100100111 |
| ( 3) | 0000101110110 | 0000111001101 | ( 68) | 0011001001110 | 0010101101001 |
| ( 4) | 0000101111010 | 0000111000111 | ( 69) | 0011001011100 | 0010101110010 |
| ( 5) | 0000110010110 | 0000101111001 | ( 70) | 0011001100110 | 0010101010101 |
| ( 6) | 0000110110110 | 0000101101101 | ( 71) | 0011001101100 | 0010101011010 |
| ( 7) | 0000110111010 | 0000101100111 | ( 72) | 0011001110010 | 0010101001011 |
| ( 8) | 0000111010110 | 0000100111101 | ( 73) | 0011001110100 | 0010101001110 |
| ( 9) | 0000111011010 | 0000100110111 | ( 74) | 0011010001110 | 0010111001001 |
| ( 10) | 0000111101010 | 0000100011111 | ( 75) | 0011010011100 | 0010111010010 |
| ( 11) | 0001001011110 | 0001101110001 | ( 76) | 0011010111000 | 0010111100100 |
| ( 12) | 0001001101110 | 0001101011001 | ( 77) | 0011011000110 | 0010110100101 |
| ( 13) | 0001001110110 | 0001101001101 | ( 78) | 0011011001100 | 0010110101010 |
| ( 14) | 0001001111010 | 0001101000111 | ( 79) | 0011011011000 | 0010110110100 |
| ( 15) | 0001010011110 | 0001111010001 | ( 80) | 0011011100010 | 0010110010011 |
| ( 16) | 0001010111100 | 0001111100010 | ( 81) | 0011011100100 | 0010110010110 |
| ( 17) | 0001011001110 | 0001110101001 | ( 82) | 0011011101000 | 0010110011100 |
| ( 18) | 0001011011100 | 0001110110010 | ( 83) | 0011100010110 | 0010010011101 |
| ( 19) | 0001011100110 | 0001110010101 | ( 84) | 0011100011010 | 0010010010111 |
| ( 20) | 0001011101100 | 0001110011010 | ( 85) | 0011100100110 | 0010010110101 |
| ( 21) | 0001011110010 | 0001110001011 | ( 86) | 0011100101100 | 0010010111010 |
| ( 22) | 0001011110100 | 0001110001110 | ( 87) | 0011100110010 | 0010010101011 |
| ( 23) | 0001100101110 | 0001010111001 | ( 88) | 0011100110100 | 0010010101110 |
| ( 24) | 0001100110110 | 0001010101101 | ( 89) | 0011101001110 | 0010011100101 |
| ( 25) | 0001100111010 | 0001010100111 | ( 90) | 0011101001100 | 0010011101010 |
| ( 26) | 0001101001110 | 0001011101001 | ( 91) | 0011101011000 | 0010011110100 |
| ( 27) | 0001101011100 | 0001011110010 | ( 92) | 0011101100010 | 0010011010011 |
| ( 28) | 0001101100110 | 0001011010101 | ( 93) | 0011101100100 | 0010011010110 |
| ( 29) | 0001101101100 | 0001011011010 | ( 94) | 0011101101000 | 0010011011100 |
| ( 30) | 0001101110010 | 0001011001011 | ( 95) | 0011110001010 | 0010001001111 |
| ( 31) | 0001101110100 | 0001011001110 | ( 96) | 0011110010010 | 0010001011011 |
| ( 32) | 0001110010110 | 0001001011101 | ( 97) | 0011110010100 | 0010001011110 |
| ( 33) | 0001110011010 | 0001001010111 | ( 98) | 0011110100010 | 0010001110011 |
| ( 34) | 0001110100110 | 0001001110101 | ( 99) | 0011110100100 | 0010001110110 |
| ( 35) | 0001110101100 | 0001001111010 | (100) | 0011110101000 | 0010001111100 |
| ( 36) | 0001110110010 | 0001001101011 | (101) | 0100001011110 | 0110001110001 |
| ( 37) | 0001110110100 | 0001001101110 | (102) | 0100001101110 | 0110001011001 |
| ( 38) | 0001111001010 | 0001000101111 | (103) | 0100001110110 | 0110001001101 |
| ( 39) | 0001111010010 | 0001000111011 | (104) | 0100001111010 | 0110001000111 |
| ( 40) | 0001111010100 | 0001000111110 | (105) | 0100010011110 | 0110011010001 |
| ( 41) | 0010001011110 | 0011001110001 | (106) | 0100010111100 | 0110011100010 |
| ( 42) | 0010001101110 | 0011001011001 | (107) | 0100011001110 | 0110010101001 |
| ( 43) | 0010001110110 | 0011001001101 | (108) | 0100011011100 | 0110010110010 |
| ( 44) | 0010001111010 | 0011001000111 | (109) | 0100011100110 | 0110010010101 |
| ( 45) | 0010010011110 | 0011011010001 | (110) | 0100011101100 | 0110010011010 |
| ( 46) | 0010010111100 | 0011011100010 | (111) | 0100011110010 | 0110010001011 |
| ( 47) | 0010011001110 | 0011010101001 | (112) | 0100011110100 | 0110010001110 |
| ( 48) | 0010011011100 | 0011010110010 | (113) | 0100100011110 | 0110110010001 |
| ( 49) | 0010011100110 | 0011010010101 | (114) | 0100100111100 | 0110110100010 |
| ( 50) | 0010011101100 | 0011010011010 | (115) | 0100101111000 | 0110111000100 |
| ( 51) | 0010011110010 | 0011010001011 | (116) | 0100110001110 | 0110101001001 |
| ( 52) | 0010011110100 | 0011010001110 | (117) | 0100110011100 | 0110101010010 |
| ( 53) | 0010100011110 | 0011110010001 | (118) | 0100110111000 | 0110101100100 |
| ( 54) | 0010100111100 | 0011110100010 | (119) | 0100111000110 | 0110100100101 |
| ( 55) | 0010101111000 | 0011111000100 | (120) | 0100111001100 | 0110100101010 |
| ( 56) | 0010110001110 | 0011101001001 | (121) | 0100111011000 | 0110100110100 |
| ( 57) | 0010110011100 | 0011101010010 | (122) | 0100111100010 | 0110100010011 |
| ( 58) | 0010110111000 | 0011101100100 | (123) | 0100111100100 | 0110100010110 |
| ( 59) | 0010111000110 | 0011100100101 | (124) | 0100111101000 | 0110100011100 |
| ( 60) | 0010111001100 | 0011100101010 | (125) | 0101000011110 | 0111100010001 |
| ( 61) | 0010111011000 | 0011100110100 | (126) | 0101000111100 | 0111100100010 |
| ( 62) | 0010111100010 | 0011100010011 | (127) | 0101001111000 | 0111101000100 |
| ( 63) | 0010111100100 | 0011100010110 | (128) | 0101011110000 | 0111110001000 |
| ( 64) | 0010111101000 | 0011100011100 | (129) | 0101100001110 | 0111010001001 |
| ( 65) | 0011000101110 | 0010100011001 | (130) | 0101100011100 | 0111010010010 |
| | | | (131) | 0101100111000 | 0111010100100 |

FIG. 13

| | (a) | (b) | | (a) | (b) |
|---|---|---|---|---|---|
| (132) | 0101101110000 | 0111011001000 | (198) | 0111101000100 | 0100011100110 |
| (133) | 0101110000110 | 0111001000101 | (199) | 0111101001000 | 0100011101100 |
| (134) | 0101110001100 | 0111001001010 | (200) | 0111101010000 | 0100011111000 |
| (135) | 0101110011000 | 0111001010100 | (201) | 1000001011110 | 1100001110001 |
| (136) | 0101110110000 | 0111001101000 | (202) | 1000001101110 | 1100001011001 |
| (137) | 0101111000010 | 0111000100011 | (203) | 1000001110110 | 1100001001101 |
| (138) | 0101111000100 | 0111000100110 | (204) | 1000001111010 | 1100001000111 |
| (139) | 0101111001000 | 0111000101100 | (205) | 1000010011110 | 1100011010001 |
| (140) | 0101111010000 | 0111000111000 | (206) | 1000010011100 | 1100011100010 |
| (141) | 0110000101110 | 0101000111001 | (207) | 1000011001110 | 1100010101001 |
| (142) | 0110000110110 | 0101000101101 | (208) | 1000011011100 | 1100010110010 |
| (143) | 0110000111010 | 0101000100111 | (209) | 1000011100110 | 1100010010101 |
| (144) | 0110001001110 | 0101001101001 | (210) | 1000011101100 | 1100010011010 |
| (145) | 0110001011100 | 0101001110010 | (211) | 1000011110010 | 1100010001011 |
| (146) | 0110001100110 | 0101001010101 | (212) | 1000011110100 | 1100010001110 |
| (147) | 0110001101100 | 0101001011010 | (213) | 1000100011110 | 1100110010001 |
| (148) | 0110001110010 | 0101001001011 | (214) | 1000100101110 | 1100110100010 |
| (149) | 0110001110100 | 0101001001110 | (215) | 1000101111000 | 1100111000100 |
| (150) | 0110010001110 | 0101011001001 | (216) | 1000110001110 | 1100101001001 |
| (151) | 0110010011100 | 0101011010010 | (217) | 1000110011100 | 1100101010010 |
| (152) | 0110010111000 | 0101011100100 | (218) | 1000110111000 | 1100101100100 |
| (153) | 0110011000110 | 0101010100101 | (219) | 1000111000110 | 1100100100101 |
| (154) | 0110011001100 | 0101010101010 | (220) | 1000111001100 | 1100100101010 |
| (155) | 0110011011000 | 0101010110100 | (221) | 1000111011000 | 1100100110100 |
| (156) | 0110011100010 | 0101010010011 | (222) | 1000111100010 | 1100100010011 |
| (157) | 0110011100100 | 0101010010110 | (223) | 1000111100100 | 1100100010110 |
| (158) | 0110011101000 | 0101010011100 | (224) | 1000111101000 | 1100100011100 |
| (159) | 0110100001110 | 0101110001001 | (225) | 1001000011110 | 1101100010001 |
| (160) | 0110100011100 | 0101110010010 | (226) | 1001000111100 | 1101100100010 |
| (161) | 0110100111000 | 0101110100100 | (227) | 1001001111000 | 1101101000100 |
| (162) | 0110101110000 | 0101111001000 | (228) | 1001011110000 | 1101111001000 |
| (163) | 0110110000110 | 0101101000101 | (229) | 1001100001110 | 1101010001001 |
| (164) | 0110110001100 | 0101101001010 | (230) | 1001100011100 | 1101010010010 |
| (165) | 0110110011000 | 0101101010100 | (231) | 1001100111000 | 1101010100100 |
| (166) | 0110110110000 | 0101101101000 | (232) | 1001101110000 | 1101011001000 |
| (167) | 0110111000010 | 0101100100011 | (233) | 1001110000110 | 1101001000101 |
| (168) | 0110111000100 | 0101100100110 | (234) | 1001110001100 | 1101001001010 |
| (169) | 0110111001000 | 0101100101100 | (235) | 1001110011000 | 1101001010100 |
| (170) | 0110111010000 | 0101100111000 | (236) | 1001110110000 | 1101001101000 |
| (171) | 0111000010110 | 0100100011101 | (237) | 1001111000010 | 1101000100011 |
| (172) | 0111000011010 | 0100100010111 | (238) | 1001111000100 | 1101000100110 |
| (173) | 0111000100110 | 0100100110101 | (239) | 1001111001000 | 1101000101100 |
| (174) | 0111000101100 | 0100100110110 | (240) | 1001111010000 | 1101000111000 |
| (175) | 0111000110010 | 0100100101011 | (241) | 1010000011110 | 1111000010001 |
| (176) | 0111000110100 | 0100100101110 | (242) | 1010000111100 | 1111000100010 |
| (177) | 0111001000110 | 0100101100101 | (243) | 1010001111000 | 1111001000100 |
| (178) | 0111001001100 | 0100101101010 | (244) | 1010011110000 | 1111010001000 |
| (179) | 0111001011000 | 0100101110100 | (245) | 1010111100000 | 1111100010000 |
| (180) | 0111001100010 | 0100101010011 | (246) | 1011000001110 | 1110100001001 |
| (181) | 0111001100100 | 0100101010110 | (247) | 1011000011100 | 1110100010010 |
| (182) | 0111001101000 | 0100101011100 | (248) | 1011000111000 | 1110100100100 |
| (183) | 0111010000110 | 0100111000101 | (249) | 1011001110000 | 1110101001000 |
| (184) | 0111010001100 | 0100111001010 | (250) | 1011011100000 | 1110110010000 |
| (185) | 0111010011000 | 0100111010100 | (251) | 1011100000110 | 1110010000101 |
| (186) | 0111010110000 | 0100111101000 | (252) | 1011100001100 | 1110010001010 |
| (187) | 0111011000010 | 0100110100011 | (253) | 1011100011000 | 1110010010100 |
| (188) | 0111011000100 | 0100110100110 | (254) | 1011100110000 | 1110010101000 |
| (189) | 0111011001000 | 0100110101100 | (255) | 1011101100000 | 1110011010000 |
| (190) | 0111011010000 | 0100110111000 | (256) | 1011110000010 | 1110001000011 |
| (191) | 0111100001010 | 0100010001111 | (257) | 1011110000100 | 1110001000110 |
| (192) | 0111100010010 | 0100010011011 | (258) | 1011110001000 | 1110001001100 |
| (193) | 0111100011100 | 0100010011110 | (259) | 1011110010000 | 1110001011000 |
| (194) | 0111100100010 | 0100010110011 | (260) | 1011110100000 | 1110001110000 |
| (195) | 0111100100100 | 0100010110110 | (261) | 1100000101110 | 1010000111001 |
| (196) | 0111100101000 | 0100010111100 | (262) | 1100000110110 | 1010000101101 |
| (197) | 0111101000010 | 0100011100011 | (263) | 1100000111010 | 1010000100111 |

FIG. 14

| | (a) | (b) | | (a) | (b) |
|---|---|---|---|---|---|
| (264) | 1100001001110 | 1010001101001 | (330) | 1110101100000 | 1001111010000 |
| (265) | 1100001011100 | 1010001110010 | (331) | 1110110000010 | 1001101000011 |
| (266) | 1100001100110 | 1010001010101 | (332) | 1110110000100 | 1001101000110 |
| (267) | 1100001101100 | 1010001011010 | (333) | 1110110001000 | 1001101001100 |
| (268) | 1100001110010 | 1010001001011 | (334) | 1110110010000 | 1001101011000 |
| (269) | 1100001110100 | 1010001001110 | (335) | 1110110100000 | 1001101110000 |
| (270) | 1100010001110 | 1010011001001 | (336) | 1111000001010 | 1000100001111 |
| (271) | 1100010011100 | 1010011010010 | (337) | 1111000010010 | 1000100011011 |
| (272) | 1100010111000 | 1010011100100 | (338) | 1111000010100 | 1000100011110 |
| (273) | 1100011000110 | 1010010100101 | (339) | 1111000100010 | 1000100110011 |
| (274) | 1100011001100 | 1010010101010 | (340) | 1111000100100 | 1000100110110 |
| (275) | 1100011011000 | 1010010110100 | (341) | 1111000101000 | 1000100111100 |
| (276) | 1100011100010 | 1010010010011 | (342) | 1111001000010 | 1000101100011 |
| (277) | 1100011100100 | 1010010010110 | (343) | 1111001000100 | 1000101100110 |
| (278) | 1100011101000 | 1010010011100 | (344) | 1111001001000 | 1000101101100 |
| (279) | 1100100001110 | 1010110001001 | (345) | 1111001010000 | 1000101111000 |
| (280) | 1100100011100 | 1010110010010 | (346) | 1111010000010 | 1000111000011 |
| (281) | 1100100111000 | 1010110100100 | (347) | 1111010000100 | 1000111000110 |
| (282) | 1100101110000 | 1010111001000 | (348) | 1111010001000 | 1000111001100 |
| (283) | 1100110000110 | 1010101000101 | (349) | 1111010010000 | 1000111011000 |
| (284) | 1100110001100 | 1010101001010 | (350) | 1111010100000 | 1000111110000 |
| (285) | 1100110011000 | 1010101010100 | | | |
| (286) | 1100110110000 | 1010101101000 | | | |
| (287) | 1100111000010 | 1010100100011 | | | |
| (288) | 1100111000100 | 1010100100110 | | | |
| (289) | 1100111001000 | 1010100101100 | | | |
| (290) | 1100111010000 | 1010100111000 | | | |
| (291) | 1101000001110 | 1011100001001 | | | |
| (292) | 1101000011100 | 1011100010010 | | | |
| (293) | 1101000111000 | 1011100100100 | | | |
| (294) | 1101001110000 | 1011101001000 | | | |
| (295) | 1101011100000 | 1011110010000 | | | |
| (296) | 1101100000110 | 1011010000101 | | | |
| (297) | 1101100001100 | 1011010001010 | | | |
| (298) | 1101100011000 | 1011010010100 | | | |
| (299) | 1101100110000 | 1011010101000 | | | |
| (300) | 1101101110000 | 1011011010000 | | | |
| (301) | 1101110000010 | 1011001000011 | | | |
| (302) | 1101110000100 | 1011001000110 | | | |
| (303) | 1101110001000 | 1011001001100 | | | |
| (304) | 1101110010000 | 1011001011000 | | | |
| (305) | 1101110100000 | 1011001110000 | | | |
| (306) | 1110000010110 | 1001000011101 | | | |
| (307) | 1110000011010 | 1001000010111 | | | |
| (308) | 1110000100110 | 1001000110101 | | | |
| (309) | 1110000101100 | 1001000111010 | | | |
| (310) | 1110000110010 | 1001000101011 | | | |
| (311) | 1110000110100 | 1001000101110 | | | |
| (312) | 1110001000110 | 1001001100101 | | | |
| (313) | 1110001001100 | 1001001101010 | | | |
| (314) | 1110001011000 | 1001001110100 | | | |
| (315) | 1110001100010 | 1001001010011 | | | |
| (316) | 1110001100100 | 1001001010110 | | | |
| (317) | 1110001101000 | 1001001011100 | | | |
| (318) | 1110010000110 | 1001011000101 | | | |
| (319) | 1110010001100 | 1001011001010 | | | |
| (320) | 1110010011000 | 1001011010100 | | | |
| (321) | 1110010110000 | 1001011101000 | | | |
| (322) | 1110011000010 | 1001010100011 | | | |
| (323) | 1110011000100 | 1001010100110 | | | |
| (324) | 1110011001000 | 1001010101100 | | | |
| (325) | 1110011010000 | 1001010111000 | | | |
| (326) | 1110100000110 | 1001110000101 | | | |
| (327) | 1110100001100 | 1001110001010 | | | |
| (328) | 1110100011000 | 1001110010100 | | | |
| (329) | 1110100110000 | 1001110101000 | | | |

FIG. 16 { CLOCK EDGE PATTERN ON PR(1,1)
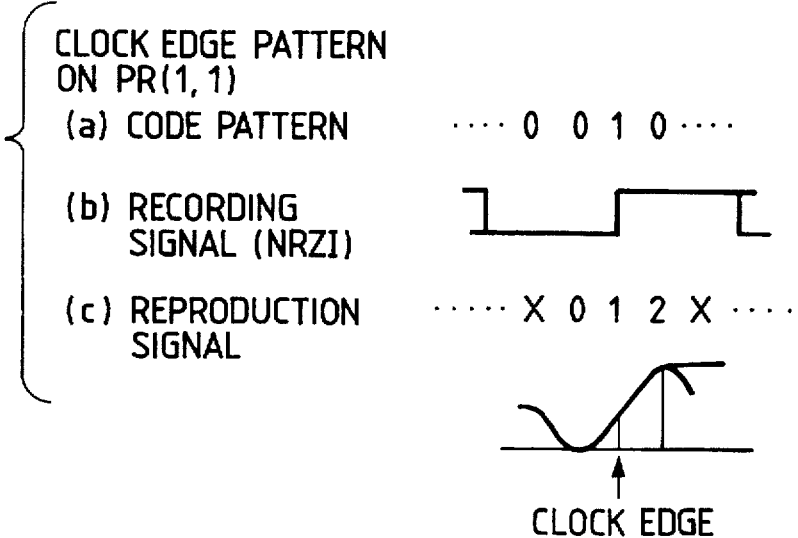
(a) CODE PATTERN ···· 0  0  1  0 ····
(b) RECORDING SIGNAL (NRZI)
(c) REPRODUCTION SIGNAL ···· X  0  1  2  X ····
CLOCK EDGE
FIG. 17 { CLOCK EDGE PATTERN
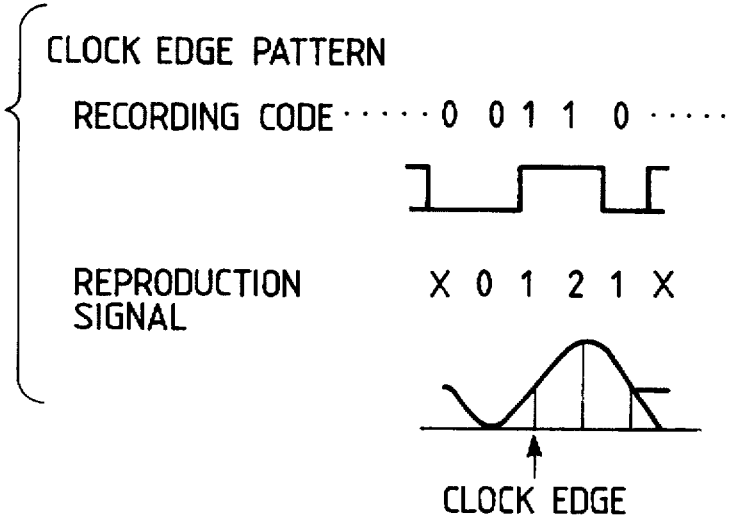
RECORDING CODE ···· 0  0  1  1  0 ····
REPRODUCTION SIGNAL     X  0  1  2  1  X
CLOCK EDGE
FIG. 18
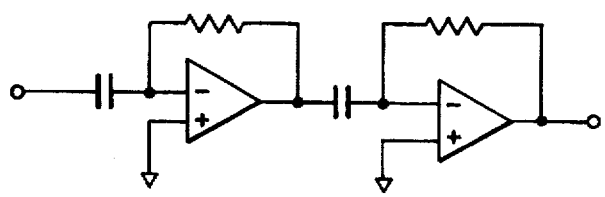

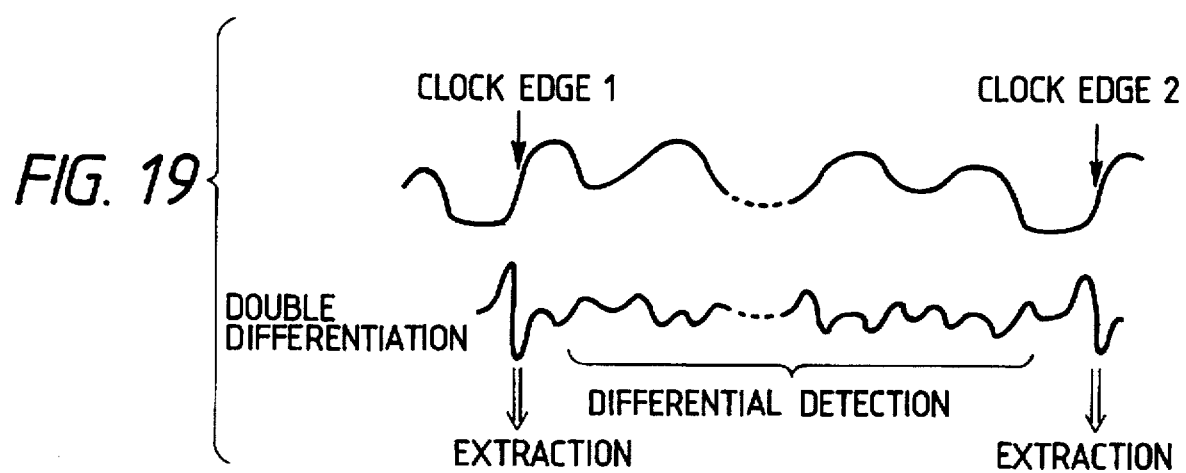
FIG. 19
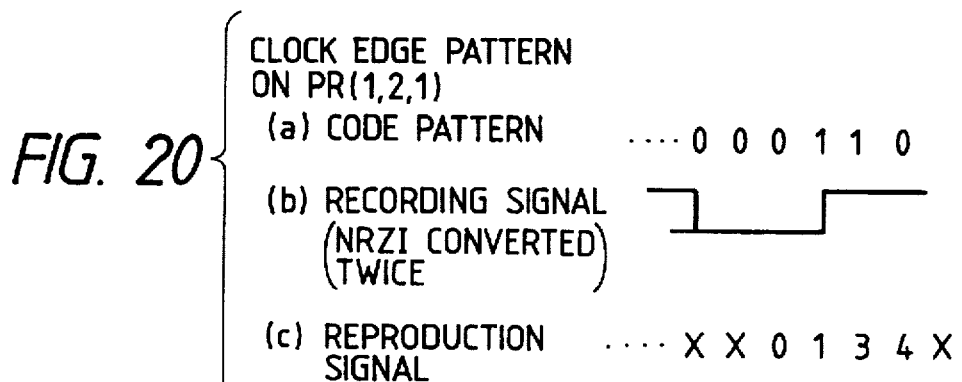
FIG. 20
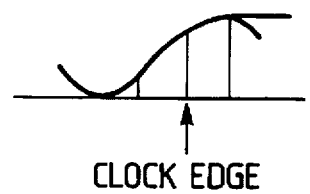

FIG. 22

| | (a) | (b) | | (a) | (b) |
|---|---|---|---|---|---|
| (1) | 00000010 | 00000011 | (66) | 00101010 | 00110100 |
| (2) | 00000100 | 00000111 | (67) | 00101011 | 00110101 |
| (3) | 00000101 | 00000110 | (68) | 00101100 | 00110111 |
| (4) | 00001000 | 00001111 | (69) | 00101101 | 00110110 |
| (5) | 00001001 | 00001110 | (70) | 00101110 | 00110100 |
| (6) | 00001010 | 00001100 | (71) | 00101111 | 00110101 |
| (7) | 00001101 | 00001101 | (72) | 00101100 | 00110100 |
| (8) | 00001110 | 00001011 | (73) | 00101101 | 00110101 |
| (9) | 00010000 | 00011111 | (74) | 00101110 | 00110011 |
| (10) | 00010001 | 00011110 | (75) | 00101111 | 00110010 |
| (11) | 00010010 | 00011100 | (76) | 00100010 | 00100011 |
| (12) | 00010011 | 00011101 | (77) | 00100100 | 00100111 |
| (13) | 00010100 | 00011000 | (78) | 00100101 | 00100110 |
| (14) | 00010101 | 00011001 | (79) | 00101000 | 00101111 |
| (15) | 00010110 | 00011011 | (80) | 00101001 | 00101110 |
| (16) | 00010111 | 00011010 | (81) | 00101010 | 00101100 |
| (17) | 00011010 | 00010011 | (82) | 00101011 | 00101101 |
| (18) | 00011100 | 00010111 | (83) | 00101110 | 00101011 |
| (19) | 00011101 | 00010110 | (84) | 00110000 | 00101111 |
| (20) | 00100000 | 00111111 | (85) | 00110001 | 00101110 |
| (21) | 00100001 | 00111110 | (86) | 00110010 | 00101100 |
| (22) | 00100010 | 00111100 | (87) | 00110011 | 00101101 |
| (23) | 00100011 | 00111101 | (88) | 00110100 | 00101000 |
| (24) | 00100100 | 00111000 | (89) | 00110101 | 00101001 |
| (25) | 00100101 | 00111001 | (90) | 00110110 | 00101011 |
| (26) | 00100110 | 00111011 | (91) | 00110111 | 00101010 |
| (27) | 00100111 | 00111010 | (92) | 00111010 | 00100011 |
| (28) | 00101000 | 00110000 | (93) | 00111100 | 00100111 |
| (29) | 00101001 | 00110001 | (94) | 00111101 | 00100110 |
| (30) | 00101010 | 00110011 | (95) | 01000010 | 01111100 |
| (31) | 00101011 | 00110010 | (96) | 01000100 | 01111000 |
| (32) | 00101100 | 00110111 | (97) | 01000101 | 01111001 |
| (33) | 00101101 | 00110110 | (98) | 01001000 | 01110000 |
| (34) | 00101110 | 00110100 | (99) | 01001001 | 01110001 |
| (35) | 00101111 | 00110101 | (100) | 01001010 | 01110011 |
| (36) | 00110010 | 00100011 | (101) | 01001011 | 01110010 |
| (37) | 00110100 | 00100111 | (102) | 01001110 | 01110100 |
| (38) | 00110101 | 00100110 | (103) | 01010000 | 01100000 |
| (39) | 00111000 | 00101111 | (104) | 01010001 | 01100001 |
| (40) | 00111001 | 00101110 | (105) | 01010010 | 01100011 |
| (41) | 00111010 | 00101100 | (106) | 01010011 | 01100010 |
| (42) | 00111011 | 00101101 | (107) | 01010100 | 01100111 |
| (43) | 00111110 | 00101011 | (108) | 01010101 | 01100110 |
| (44) | 01000000 | 01111111 | (109) | 01010110 | 01100100 |
| (45) | 01000001 | 01111110 | (110) | 01010111 | 01100101 |
| (46) | 01000010 | 01111100 | (111) | 01011010 | 01101100 |
| (47) | 01000011 | 01111101 | (112) | 01011100 | 01101000 |
| (48) | 01000100 | 01111000 | (113) | 01011101 | 01101001 |
| (49) | 01000101 | 01111001 | (114) | 01100000 | 01000000 |
| (50) | 01000110 | 01111011 | (115) | 01100001 | 01000001 |
| (51) | 01000111 | 01111010 | (116) | 01100010 | 01000011 |
| (52) | 01001000 | 01110000 | (117) | 01100011 | 01000010 |
| (53) | 01001001 | 01110001 | (118) | 01100100 | 01000111 |
| (54) | 01001010 | 01110011 | (119) | 01100101 | 01000110 |
| (55) | 01001011 | 01110010 | (120) | 01100110 | 01000100 |
| (56) | 01001100 | 01110111 | (121) | 01100111 | 01000101 |
| (57) | 01001101 | 01110110 | (122) | 01101000 | 01001111 |
| (58) | 01001110 | 01110100 | (123) | 01101001 | 01001110 |
| (59) | 01001111 | 01110101 | (124) | 01101010 | 01001100 |
| (60) | 01010000 | 01100000 | (125) | 01101011 | 01001101 |
| (61) | 01010001 | 01100001 | (126) | 01101100 | 01001000 |
| (62) | 01010010 | 01100011 | (127) | 01101101 | 01001001 |
| (63) | 01010011 | 01100010 | (128) | 01101110 | 01001011 |
| (64) | 01010100 | 01100111 | (129) | 01101111 | 01001010 |
| (65) | 01010101 | 01100110 | (130) | 01110010 | 01011100 |
| | | | (131) | 01110100 | 01011000 |

FIG. 23

| | (a) | (b) | | (a) | (b) |
|---|---|---|---|---|---|
| (132) | 010110101 | 011011001 | (198) | 100101010 | 111001100 |
| (133) | 010111000 | 011010000 | (199) | 100101011 | 111001101 |
| (134) | 010111001 | 011010001 | (200) | 100101100 | 111001000 |
| (135) | 010111010 | 011010011 | (201) | 100101101 | 111001001 |
| (136) | 010111011 | 011010010 | (202) | 100101110 | 111001011 |
| (137) | 010111110 | 011010100 | (203) | 100101111 | 111001010 |
| (138) | 011000010 | 010000011 | (204) | 100110010 | 111011100 |
| (139) | 011000100 | 010000111 | (205) | 100110100 | 111011000 |
| (140) | 011000101 | 010000110 | (206) | 100110101 | 111011001 |
| (141) | 011001000 | 010001111 | (207) | 100111000 | 111010000 |
| (142) | 011001001 | 010001110 | (208) | 100111001 | 111010001 |
| (143) | 011001010 | 010001100 | (209) | 100111010 | 111010011 |
| (144) | 011001011 | 010001101 | (210) | 100111011 | 111010010 |
| (145) | 011001110 | 010001011 | (211) | 100111110 | 111010100 |
| (146) | 011010000 | 010011111 | (212) | 101000000 | 110000000 |
| (147) | 011010001 | 010011110 | (213) | 101000001 | 110000001 |
| (148) | 011010010 | 010011100 | (214) | 101000010 | 110000011 |
| (149) | 011010011 | 010011101 | (215) | 101000011 | 110000010 |
| (150) | 011010100 | 010011000 | (216) | 101000100 | 110000111 |
| (151) | 011010101 | 010011001 | (217) | 101000101 | 110000110 |
| (152) | 011010110 | 010011011 | (218) | 101000110 | 110000100 |
| (153) | 011010111 | 010011010 | (219) | 101000111 | 110000101 |
| (154) | 011011010 | 010010011 | (220) | 101001000 | 110001111 |
| (155) | 011011100 | 010010111 | (221) | 101001001 | 110001110 |
| (156) | 011011101 | 010010110 | (222) | 101001010 | 110001100 |
| (157) | 011100010 | 010111100 | (223) | 101001011 | 110001101 |
| (158) | 011100100 | 010111000 | (224) | 101001100 | 110001000 |
| (159) | 011100101 | 010111001 | (225) | 101001101 | 110001001 |
| (160) | 011101000 | 010110000 | (226) | 101001110 | 110001011 |
| (161) | 011101001 | 010110001 | (227) | 101001111 | 110001010 |
| (162) | 011101010 | 010110011 | (228) | 101010000 | 110011111 |
| (163) | 011101011 | 010110010 | (229) | 101010001 | 110011110 |
| (164) | 011101110 | 010110100 | (230) | 101010010 | 110011100 |
| (165) | 011110010 | 010100011 | (231) | 101010011 | 110011101 |
| (166) | 011110100 | 010100111 | (232) | 101010100 | 110011000 |
| (167) | 011110101 | 010100110 | (233) | 101010101 | 110011001 |
| (168) | 011111010 | 010101100 | (234) | 101010110 | 110011011 |
| (169) | 100000010 | 111111100 | (235) | 101010111 | 110011010 |
| (170) | 100000100 | 111111000 | (236) | 101011000 | 110010000 |
| (171) | 100000101 | 111111001 | (237) | 101011001 | 110010001 |
| (172) | 100001000 | 111110000 | (238) | 101011010 | 110010011 |
| (173) | 100001001 | 111110001 | (239) | 101011011 | 110010010 |
| (174) | 100001010 | 111110011 | (240) | 101011100 | 110010111 |
| (175) | 100001011 | 111110010 | (241) | 101011101 | 110010110 |
| (176) | 100001110 | 111110100 | (242) | 101011110 | 110010100 |
| (177) | 100010000 | 111100000 | (243) | 101011111 | 110010101 |
| (178) | 100010001 | 111100001 | (244) | 101100010 | 110111100 |
| (179) | 100010010 | 111100011 | (245) | 101100100 | 110111000 |
| (180) | 100010011 | 111100010 | (246) | 101100101 | 110111001 |
| (181) | 100010100 | 111100111 | (247) | 101101000 | 110110000 |
| (182) | 100010101 | 111100110 | (248) | 101101001 | 110110001 |
| (183) | 100010110 | 111100100 | (249) | 101101010 | 110110011 |
| (184) | 100010111 | 111100101 | (250) | 101101011 | 110110010 |
| (185) | 100011010 | 111101100 | (251) | 101101110 | 110110100 |
| (186) | 100011100 | 111101000 | (252) | 101110000 | 110100000 |
| (187) | 100011101 | 111101001 | (253) | 101110001 | 110100001 |
| (188) | 100100000 | 111000000 | (254) | 101110010 | 110100011 |
| (189) | 100100001 | 111000001 | (255) | 101110011 | 110100010 |
| (190) | 100100010 | 111000011 | (256) | 101110100 | 110100111 |
| (191) | 100100011 | 111000010 | (257) | 101110101 | 110100110 |
| (192) | 100100100 | 111000111 | (258) | 101110110 | 110100100 |
| (193) | 100100101 | 111000110 | (259) | 101110111 | 110100101 |
| (194) | 100100110 | 111000100 | (260) | 101111010 | 110101100 |
| (195) | 100100111 | 111000101 | (261) | 101111100 | 110101000 |
| (196) | 100101000 | 111001111 | (262) | 101111101 | 110101001 |
| (197) | 100101001 | 111001110 | (263) | 110000010 | 100000011 |

FIG. 24

| | (a) | (b) | | (a) | (b) |
|---|---|---|---|---|---|
| (264) | 110000100 | 100000111 | (330) | 111101010 | 101001100 |
| (265) | 110000101 | 100000110 | (331) | 111101011 | 101001101 |
| (266) | 110001000 | 100001111 | (332) | 111101110 | 101001011 |
| (267) | 110001001 | 100001110 | (333) | 111110010 | 101011100 |
| (268) | 110001010 | 100001100 | (334) | 111110100 | 101011000 |
| (269) | 110001011 | 100001101 | (335) | 111110101 | 101011001 |
| (270) | 110001110 | 100001011 | (336) | 111111010 | 101010011 |
| (271) | 110010000 | 100011111 | | | |
| (272) | 110010001 | 100011110 | | | |
| (273) | 110010010 | 100011100 | | | |
| (274) | 110010011 | 100011101 | | | |
| (275) | 110010100 | 100011000 | | | |
| (276) | 110010101 | 100011001 | | | |
| (277) | 110010110 | 100011011 | | | |
| (278) | 110010111 | 100011010 | | | |
| (279) | 110011010 | 100010011 | | | |
| (280) | 110011100 | 100010111 | | | |
| (281) | 110011101 | 100010110 | | | |
| (282) | 110100000 | 100111111 | | | |
| (283) | 110100001 | 100111110 | | | |
| (284) | 110100010 | 100111100 | | | |
| (285) | 110100011 | 100111101 | | | |
| (286) | 110100100 | 100111000 | | | |
| (287) | 110100101 | 100111001 | | | |
| (288) | 110100110 | 100111011 | | | |
| (289) | 110100111 | 100111010 | | | |
| (290) | 110101000 | 100110000 | | | |
| (291) | 110101001 | 100110001 | | | |
| (292) | 110101010 | 100110011 | | | |
| (293) | 110101011 | 100110010 | | | |
| (294) | 110101100 | 100110111 | | | |
| (295) | 110101101 | 100110110 | | | |
| (296) | 110101110 | 100110100 | | | |
| (297) | 110101111 | 100110101 | | | |
| (298) | 110110010 | 100100011 | | | |
| (299) | 110110100 | 100100111 | | | |
| (300) | 110110101 | 100100110 | | | |
| (301) | 110111000 | 100101111 | | | |
| (302) | 110111001 | 100101110 | | | |
| (303) | 110111010 | 100101100 | | | |
| (304) | 110111011 | 100101101 | | | |
| (305) | 110111110 | 100101011 | | | |
| (306) | 111000010 | 101111100 | | | |
| (307) | 111000100 | 101111000 | | | |
| (308) | 111000101 | 101111001 | | | |
| (309) | 111001000 | 101110000 | | | |
| (310) | 111001001 | 101110001 | | | |
| (311) | 111001010 | 101110011 | | | |
| (312) | 111001011 | 101110010 | | | |
| (313) | 111001110 | 101110100 | | | |
| (314) | 111010000 | 101100000 | | | |
| (315) | 111010001 | 101100001 | | | |
| (316) | 111010010 | 101100011 | | | |
| (317) | 111010011 | 101100010 | | | |
| (318) | 111010100 | 101100111 | | | |
| (319) | 111010101 | 101100110 | | | |
| (320) | 111010110 | 101100100 | | | |
| (321) | 111010111 | 101100101 | | | |
| (322) | 111011010 | 101101100 | | | |
| (323) | 111011100 | 101101000 | | | |
| (324) | 111011101 | 101101001 | | | |
| (325) | 111100010 | 101000011 | | | |
| (326) | 111100100 | 101000111 | | | |
| (327) | 111100101 | 101000110 | | | |
| (328) | 111101000 | 101001111 | | | |
| (329) | 111101001 | 101001110 | | | |

FIG. 26

|     | (a)        | (b)        |       | (a)        | (b)        |
|-----|------------|------------|-------|------------|------------|
| (1) | 00000000110 | 00000000111 | (66) | 00010111010 | 00010011101 |
| (2) | 00000001100 | 00000001111 | (67) | 00010111011 | 00010011100 |
| (3) | 00000001101 | 00000001110 | (68) | 00011000000 | 00011111111 |
| (4) | 00000010010 | 00000010111 | (69) | 00011000001 | 00011111110 |
| (5) | 00000011000 | 00000011111 | (70) | 00011000010 | 00011111101 |
| (6) | 00000011001 | 00000011110 | (71) | 00011000011 | 00011111100 |
| (7) | 00000011010 | 00000011101 | (72) | 00011000100 | 00011111010 |
| (8) | 00000011011 | 00000011100 | (73) | 00011000101 | 00011111011 |
| (9) | 00000100100 | 00000101111 | (74) | 00011000110 | 00011111000 |
| (10) | 00000100101 | 00000101110 | (75) | 00011000111 | 00011111001 |
| (11) | 00000101110 | 00000100111 | (76) | 00011001000 | 00011110101 |
| (12) | 00000110000 | 00000111111 | (77) | 00011001001 | 00011110100 |
| (13) | 00000110001 | 00000111110 | (78) | 00011001010 | 00011110111 |
| (14) | 00000110010 | 00000111101 | (79) | 00011001011 | 00011110110 |
| (15) | 00000110011 | 00000111100 | (80) | 00011001100 | 00011110000 |
| (16) | 00000110100 | 00000111010 | (81) | 00011001101 | 00011110001 |
| (17) | 00000110101 | 00000111011 | (82) | 00011001110 | 00011110010 |
| (18) | 00000110110 | 00000111000 | (83) | 00011001111 | 00011110011 |
| (19) | 00000110111 | 00000111001 | (84) | 00011010000 | 00011101010 |
| (20) | 00000111010 | 00000110111 | (85) | 00011010001 | 00011101011 |
| (21) | 00001000010 | 00001010111 | (86) | 00011010010 | 00011101000 |
| (22) | 00001001000 | 00001011111 | (87) | 00011010011 | 00011101001 |
| (23) | 00001001001 | 00001011110 | (88) | 00011010100 | 00011101111 |
| (24) | 00001001010 | 00001011101 | (89) | 00011010101 | 00011101110 |
| (25) | 00001001011 | 00001011100 | (90) | 00011010110 | 00011101101 |
| (26) | 00001010110 | 00001000111 | (91) | 00011010111 | 00011101100 |
| (27) | 00001011100 | 00001001111 | (92) | 00011011000 | 00011100000 |
| (28) | 00001011101 | 00001001110 | (93) | 00011011001 | 00011100001 |
| (29) | 00001100000 | 00001111111 | (94) | 00011011010 | 00011100010 |
| (30) | 00001100001 | 00001111110 | (95) | 00011011011 | 00011100011 |
| (31) | 00001100010 | 00001111101 | (96) | 00011011100 | 00011100101 |
| (32) | 00001100011 | 00001111100 | (97) | 00011011101 | 00011100100 |
| (33) | 00001100100 | 00001111010 | (98) | 00011011110 | 00011100111 |
| (34) | 00001100101 | 00001111011 | (99) | 00011011111 | 00011100110 |
| (35) | 00001100110 | 00001111000 | (100) | 00011100010 | 00011010111 |
| (36) | 00001100111 | 00001111001 | (101) | 00011101000 | 00011011111 |
| (37) | 00001101000 | 00001110101 | (102) | 00011101001 | 00011011110 |
| (38) | 00001101001 | 00001110100 | (103) | 00011101010 | 00011011101 |
| (39) | 00001101010 | 00001110111 | (104) | 00011101011 | 00011011100 |
| (40) | 00001101011 | 00001110110 | (105) | 00011110110 | 00011000111 |
| (41) | 00001101100 | 00001110000 | (106) | 00011111100 | 00011001111 |
| (42) | 00001101101 | 00001110001 | (107) | 00011111101 | 00011001110 |
| (43) | 00001101110 | 00001110010 | (108) | 00100010110 | 00101000111 |
| (44) | 00001101111 | 00001110011 | (109) | 00100100110 | 00101111000 |
| (45) | 00001110100 | 00001101111 | (110) | 00100101100 | 00101110000 |
| (46) | 00001110101 | 00001101110 | (111) | 00100101101 | 00101110001 |
| (47) | 00001111110 | 00001100111 | (112) | 00101000110 | 00100000111 |
| (48) | 00010000100 | 00010101111 | (113) | 00101001100 | 00100001111 |
| (49) | 00010001110 | 00010101110 | (114) | 00101001101 | 00100001110 |
| (50) | 00010001110 | 00010100111 | (115) | 00101010010 | 00100010111 |
| (51) | 00010010000 | 00010111111 | (116) | 00101011000 | 00100011111 |
| (52) | 00010010001 | 00010111110 | (117) | 00101011001 | 00100011110 |
| (53) | 00010010010 | 00010111101 | (118) | 00101011010 | 00100011101 |
| (54) | 00010010011 | 00010111100 | (119) | 00101011011 | 00100011100 |
| (55) | 00010010100 | 00010111010 | (120) | 00101110110 | 00100111000 |
| (56) | 00010010101 | 00010111011 | (121) | 00110000110 | 00111111000 |
| (57) | 00010010110 | 00010111000 | (122) | 00110001100 | 00111110000 |
| (58) | 00010010111 | 00010111001 | (123) | 00110001101 | 00111110001 |
| (59) | 00010011010 | 00010110111 | (124) | 00110010010 | 00111101000 |
| (60) | 00010100110 | 00010000111 | (125) | 00110011000 | 00111100000 |
| (61) | 00010101100 | 00010001111 | (126) | 00110011001 | 00111100001 |
| (62) | 00010101101 | 00010001110 | (127) | 00110011010 | 00111100010 |
| (63) | 00010110010 | 00010010111 | (128) | 00110011011 | 00111100011 |
| (64) | 00010111000 | 00010011111 | (129) | 00110100100 | 00111010000 |
| (65) | 00010111001 | 00010011110 | (130) | 00110100101 | 00111010001 |
|     |            |            | (131) | 00110101110 | 00111011000 |

FIG. 27

|  | (a) | (b) |  | (a) | (b) |
|---|---|---|---|---|---|
| (132) | 0011011000 | 0011100000 | (198) | 0110011010 | 0111100010 |
| (133) | 0011011001 | 0011100001 | (199) | 0110011011 | 0111100011 |
| (134) | 0011011010 | 0011100010 | (200) | 0110011011 | 0111100011 |
| (135) | 0011011011 | 0011100011 | (201) | 0110011101 | 0111100100 |
| (136) | 0011011100 | 0011100101 | (202) | 0110100010 | 0111010100 |
| (137) | 0011011101 | 0011100100 | (203) | 0110100100 | 0111010000 |
| (138) | 0011011110 | 0011100111 | (204) | 0110100101 | 0111010001 |
| (139) | 0011011111 | 0011100110 | (205) | 0110100110 | 0111010010 |
| (140) | 0011011110 | 0011001000 | (206) | 0110100111 | 0111010011 |
| (141) | 0011101010 | 0011011000 | (207) | 0110101010 | 0111011100 |
| (142) | 0011110010 | 0011000111 | (208) | 0110101100 | 0111011000 |
| (143) | 0011110100 | 0011001111 | (209) | 0110101101 | 0111011001 |
| (144) | 0011110101 | 0011001110 | (210) | 0110110000 | 0111000000 |
| (145) | 0100001011 | 0101011000 | (211) | 0110110001 | 0111000001 |
| (146) | 0100010010 | 0101000011 | (212) | 0110110010 | 0111000010 |
| (147) | 0100010100 | 0101000111 | (213) | 0110110011 | 0111000011 |
| (148) | 0100010101 | 0101000110 | (214) | 0110110100 | 0111000101 |
| (149) | 0100100010 | 0101111000 | (215) | 0110110101 | 0111000100 |
| (150) | 0100100100 | 0101110000 | (216) | 0110110110 | 0111000111 |
| (151) | 0100100101 | 0101110001 | (217) | 0110110111 | 0111000110 |
| (152) | 0100101010 | 0101101000 | (218) | 0110111000 | 0111000101 |
| (153) | 0100101100 | 0101110000 | (219) | 0110111001 | 0111000101 |
| (154) | 0100101101 | 0101110001 | (220) | 0110111010 | 0111000001 |
| (155) | 0100101110 | 0101110010 | (221) | 0110111011 | 0111000001 |
| (156) | 0100101111 | 0101110011 | (222) | 0110111100 | 0111000111 |
| (157) | 0100110010 | 0101100011 | (223) | 0110111101 | 0111000110 |
| (158) | 0101000110 | 0100000111 | (224) | 0110111110 | 0111000101 |
| (159) | 0101001100 | 0100001111 | (225) | 0110111111 | 0111000100 |
| (160) | 0101001101 | 0100001110 | (226) | 0110111000 | 0111010000 |
| (161) | 0101001010 | 0100010011 | (227) | 0110111001 | 0111010001 |
| (162) | 0101001100 | 0100001111 | (228) | 0110111110 | 0111011000 |
| (163) | 0101001101 | 0100001110 | (229) | 0111001010 | 0110100011 |
| (164) | 0101001110 | 0100001101 | (230) | 0111010010 | 0110111000 |
| (165) | 0101001111 | 0100001100 | (231) | 0111010100 | 0110111000 |
| (166) | 0101010010 | 0100001111 | (232) | 0111010101 | 0110111001 |
| (167) | 0101010101 | 0100001110 | (233) | 0111100010 | 0110000111 |
| (168) | 0101010110 | 0100000111 | (234) | 0111100100 | 0110001111 |
| (169) | 0101011000 | 0100001111 | (235) | 0111100101 | 0110001110 |
| (170) | 0101011001 | 0100001110 | (236) | 0111101010 | 0110010111 |
| (171) | 0101011010 | 0100001101 | (237) | 0111101100 | 0110001111 |
| (172) | 0101011011 | 0100001100 | (238) | 0111101101 | 0110001110 |
| (173) | 0101011100 | 0100001010 | (239) | 0111101110 | 0110001101 |
| (174) | 0101011101 | 0100001011 | (240) | 0111101111 | 0110001100 |
| (175) | 0101011110 | 0100001000 | (241) | 0111110110 | 0110011000 |
| (176) | 0101011111 | 0100001001 | (242) | 1000001010 | 1010100011 |
| (177) | 0101011010 | 0100001111 | (243) | 1000010010 | 1010111000 |
| (178) | 0101101010 | 0100100011 | (244) | 1000010100 | 1010111000 |
| (179) | 0101110010 | 0100111000 | (245) | 1000010101 | 1010111001 |
| (180) | 0101110100 | 0100111000 | (246) | 1000100010 | 1010000111 |
| (181) | 0101110101 | 0100111001 | (247) | 1000100100 | 1010001111 |
| (182) | 0110000010 | 0111111000 | (248) | 1000100101 | 1010001110 |
| (183) | 0110000100 | 0111110000 | (249) | 1000101010 | 1010010111 |
| (184) | 0110000101 | 0111110001 | (250) | 1000101100 | 1010011111 |
| (185) | 0110001010 | 0111101000 | (251) | 1000101101 | 1010011110 |
| (186) | 0110001100 | 0111100000 | (252) | 1000101110 | 1010011101 |
| (187) | 0110001101 | 0111100001 | (253) | 1000101111 | 1010011100 |
| (188) | 0110001110 | 0111100010 | (254) | 1000110110 | 1010011000 |
| (189) | 0110001111 | 0111100011 | (255) | 1001000010 | 1011111000 |
| (190) | 0110010010 | 0111010000 | (256) | 1001000100 | 1011110000 |
| (191) | 0110010101 | 0111010001 | (257) | 1001000101 | 1011110001 |
| (192) | 0110010110 | 0111011000 | (258) | 1001001010 | 1011101000 |
| (193) | 0110011000 | 0111000000 | (259) | 1001001100 | 1011100000 |
| (194) | 0110011001 | 0111000001 | (260) | 1001001101 | 1011100001 |
| (195) | 0110011010 | 0111000010 | (261) | 1001001110 | 1011100010 |
| (196) | 0110011011 | 0111000011 | (262) | 1001001111 | 1011100011 |
| (197) | 0110011100 | 0111000101 | (263) | 1001010010 | 1011101000 |

FIG. 28

| | (a) | (b) | | (a) | (b) |
|---|---|---|---|---|---|
| (264) | 1001010101 | 1011101001 | (330) | 1011100110 | 1001111000 |
| (265) | 1001010111 | 1011101100 | (331) | 1011100100 | 1001111000 |
| (266) | 1001011000 | 1011100000 | (332) | 1011100101 | 1001111001 |
| (267) | 1001011001 | 1011100001 | (333) | 1011101001 | 1001110100 |
| (268) | 1001011010 | 1011100010 | (334) | 1011101000 | 1001110000 |
| (269) | 1001011011 | 1011100011 | (335) | 1011101001 | 1001110001 |
| (270) | 1001011100 | 1011100101 | (336) | 1011101010 | 1001110010 |
| (271) | 1001011101 | 1011100100 | (337) | 1011101011 | 1001110011 |
| (272) | 1001011110 | 1011100111 | (338) | 1011110110 | 1001100011 |
| (273) | 1001011111 | 1011100110 | (339) | 1100000110 | 1111111000 |
| (274) | 1001011010 | 1011001000 | (340) | 1100000100 | 1111110000 |
| (275) | 1001101011 | 1011011100 | (341) | 1100001101 | 1111110001 |
| (276) | 1001110011 | 1011000111 | (342) | 1100001010 | 1111101000 |
| (277) | 1001110100 | 1011001111 | (343) | 1100001100 | 1111100000 |
| (278) | 1001110101 | 1011001110 | (344) | 1100001101 | 1111100001 |
| (279) | 1010000110 | 1000000111 | (345) | 1100001010 | 1111100010 |
| (280) | 1010000100 | 1000000111 | (346) | 1100001011 | 1111100011 |
| (281) | 1010000101 | 1000000110 | (347) | 1100010100 | 1111101000 |
| (282) | 1010001010 | 1000001011 | (348) | 1100010101 | 1111101001 |
| (283) | 1010001000 | 1000001111 | (349) | 1100010110 | 1111101000 |
| (284) | 1010001001 | 1000001110 | (350) | 1100011000 | 1111100000 |
| (285) | 1010001010 | 1000001101 | (351) | 1100011001 | 1111100001 |
| (286) | 1010001011 | 1000001100 | (352) | 1100011010 | 1111100010 |
| (287) | 1010010100 | 1000010111 | (353) | 1100011011 | 1111100011 |
| (288) | 1010010101 | 1000010110 | (354) | 1100011100 | 1111100101 |
| (289) | 1010010110 | 1000010111 | (355) | 1100011101 | 1111100100 |
| (290) | 1010011000 | 1000011111 | (356) | 1100011110 | 1111100111 |
| (291) | 1010011001 | 1000011110 | (357) | 1100011111 | 1111100110 |
| (292) | 1010011010 | 1000011101 | (358) | 1100011010 | 1111101000 |
| (293) | 1010011011 | 1000011100 | (359) | 1100100010 | 1111101000 |
| (294) | 1010011100 | 1000011010 | (360) | 1100101000 | 1111100000 |
| (295) | 1010011101 | 1000011011 | (361) | 1100101001 | 1111100001 |
| (296) | 1010011110 | 1000011000 | (362) | 1100101010 | 1111100010 |
| (297) | 1010011111 | 1000011001 | (363) | 1100101011 | 1111100011 |
| (298) | 1010011010 | 1000110111 | (364) | 1100101010 | 1111101100 |
| (299) | 1010100010 | 1000101011 | (365) | 1100101110 | 1111101000 |
| (300) | 1010101000 | 1000101111 | (366) | 1100101101 | 1111101001 |
| (301) | 1010101001 | 1000101110 | (367) | 1100110000 | 1111100000 |
| (302) | 1010101010 | 1000101101 | (368) | 1100110001 | 1111100001 |
| (303) | 1010101011 | 1000101100 | (369) | 1100110010 | 1111100010 |
| (304) | 1010101010 | 1000100111 | (370) | 1100110011 | 1111100011 |
| (305) | 1010101100 | 1000100111 | (371) | 1100110100 | 1111100101 |
| (306) | 1010101101 | 1000101110 | (372) | 1100110101 | 1111100100 |
| (307) | 1010110000 | 1000111111 | (373) | 1100110110 | 1111100111 |
| (308) | 1010110001 | 1000111110 | (374) | 1100110111 | 1111100110 |
| (309) | 1010110010 | 1000111101 | (375) | 1100110100 | 1111101010 |
| (310) | 1010110011 | 1000111100 | (376) | 1100110101 | 1111101011 |
| (311) | 1010110100 | 1000111010 | (377) | 1100110100 | 1111101000 |
| (312) | 1010110101 | 1000111011 | (378) | 1100110101 | 1111101001 |
| (313) | 1010110110 | 1000111000 | (379) | 1100110100 | 1111101111 |
| (314) | 1010110011 | 1000111001 | (380) | 1100110101 | 1111101110 |
| (315) | 1010101000 | 1000110101 | (381) | 1100110110 | 1111101101 |
| (316) | 1010101001 | 1000110100 | (382) | 1100110111 | 1111101100 |
| (317) | 1010101010 | 1000110111 | (383) | 1100111000 | 1111100000 |
| (318) | 1010101011 | 1000110110 | (384) | 1100111001 | 1111100001 |
| (319) | 1010101100 | 1000110000 | (385) | 1100111010 | 1111101100 |
| (320) | 1010101101 | 1000110001 | (386) | 1101000100 | 1111101000 |
| (321) | 1010101110 | 1000110010 | (387) | 1101000101 | 1111101001 |
| (322) | 1010101111 | 1000110011 | (388) | 1101000110 | 1111101100 |
| (323) | 1010111000 | 1000110111 | (389) | 1101001000 | 1111100000 |
| (324) | 1010111001 | 1000110110 | (390) | 1101001001 | 1111100001 |
| (325) | 1010111110 | 1000110011 | (391) | 1101001010 | 1111100010 |
| (326) | 1011001010 | 1001011000 | (392) | 1101001011 | 1111100011 |
| (327) | 1011010010 | 1001000111 | (393) | 1101001010 | 1111100101 |
| (328) | 1011010100 | 1001001111 | (394) | 1101001011 | 1111100100 |
| (329) | 1011010101 | 1001000110 | (395) | 1101001010 | 1111100111 |

FIG. 29

| | (a) | (b) | | (a) | (b) |
|---|---|---|---|---|---|
| (396) | 11010010111 | 11101000110 | (462) | 11110010010 | 11000010111 |
| (397) | 11010011010 | 11101001000 | (463) | 11110011000 | 11000011111 |
| (398) | 11010100110 | 11101111000 | (464) | 11110011001 | 11000011110 |
| (399) | 11010101100 | 11101110000 | (465) | 11110011010 | 11000011101 |
| (400) | 11010101101 | 11101110001 | (466) | 11110011011 | 11000011100 |
| (401) | 11010110010 | 11101101000 | (467) | 11110100100 | 11000101111 |
| (402) | 11010111000 | 11101100000 | (468) | 11110100101 | 11000101110 |
| (403) | 11010111001 | 11101100001 | (469) | 11110101110 | 11000100111 |
| (404) | 11010111010 | 11101100010 | (470) | 11110110000 | 11000111111 |
| (405) | 11010111011 | 11101100011 | (471) | 11110110001 | 11000111110 |
| (406) | 11011000000 | 11100000000 | (472) | 11110110010 | 11000111101 |
| (407) | 11011000001 | 11100000001 | (473) | 11110110011 | 11000111100 |
| (408) | 11011000010 | 11100000010 | (474) | 11110110100 | 11000111010 |
| (409) | 11011000011 | 11100000011 | (475) | 11110110101 | 11000111011 |
| (410) | 11011000100 | 11100000101 | (476) | 11110110110 | 11000111000 |
| (411) | 11011000101 | 11100000100 | (477) | 11110110111 | 11000111001 |
| (412) | 11011000110 | 11100000111 | (478) | 11110111010 | 11000110111 |
| (413) | 11011000111 | 11100000110 | (479) | 11111010110 | 11001000111 |
| (414) | 11011001000 | 11100001010 | (480) | 11111100110 | 11001111000 |
| (415) | 11011001001 | 11100001011 | (481) | 11111101100 | 11001110000 |
| (416) | 11011001010 | 11100001000 | (482) | 11111101101 | 11001110001 |
| (417) | 11011001011 | 11100001001 | | | |
| (418) | 11011001100 | 11100001111 | | | |
| (419) | 11011001101 | 11100001110 | | | |
| (420) | 11011001110 | 11100001101 | | | |
| (421) | 11011001111 | 11100001100 | | | |
| (422) | 11011010000 | 11100010101 | | | |
| (423) | 11011010001 | 11100010100 | | | |
| (424) | 11011010010 | 11100010111 | | | |
| (425) | 11011010011 | 11100010110 | | | |
| (426) | 11011010100 | 11100010000 | | | |
| (427) | 11011010101 | 11100010001 | | | |
| (428) | 11011010110 | 11100010010 | | | |
| (429) | 11011010111 | 11100010011 | | | |
| (430) | 11011011000 | 11100011111 | | | |
| (431) | 11011011001 | 11100011110 | | | |
| (432) | 11011011010 | 11100011101 | | | |
| (433) | 11011011011 | 11100011100 | | | |
| (434) | 11011011100 | 11100011010 | | | |
| (435) | 11011011101 | 11100011011 | | | |
| (436) | 11011011110 | 11100011000 | | | |
| (437) | 11011011111 | 11100011001 | | | |
| (438) | 11011100010 | 11100101000 | | | |
| (439) | 11011101000 | 11100100000 | | | |
| (440) | 11011101001 | 11100100001 | | | |
| (441) | 11011101010 | 11100100010 | | | |
| (442) | 11011101011 | 11100100011 | | | |
| (443) | 11011110110 | 11100111000 | | | |
| (444) | 11011111100 | 11100110000 | | | |
| (445) | 11011111101 | 11100110001 | | | |
| (446) | 11100010110 | 11010111000 | | | |
| (447) | 11100100110 | 11010000111 | | | |
| (448) | 11100101100 | 11010001111 | | | |
| (449) | 11100101101 | 11010001110 | | | |
| (450) | 11101000110 | 11011111000 | | | |
| (451) | 11101001100 | 11011110000 | | | |
| (452) | 11101001101 | 11011110001 | | | |
| (453) | 11101010010 | 11011101000 | | | |
| (454) | 11101011000 | 11011100000 | | | |
| (455) | 11101011001 | 11011100001 | | | |
| (456) | 11101011010 | 11011100010 | | | |
| (457) | 11101011011 | 11011100011 | | | |
| (458) | 11101110110 | 11011000111 | | | |
| (459) | 11110000110 | 11000000111 | | | |
| (460) | 11110001100 | 11000001111 | | | |
| (461) | 11110001101 | 11000001110 | | | |

INFORMATION RECORDING-REPRODUCING APPARATUS

BACKGROUND OF THE INVENTION

1. Field of the Invention

This invention relates to an information recording-reproducing apparatus for effecting the recording and/or reproduction of digital information on/from an information recording medium such as a magneto-optical disc.

2. Related Background Art

As tracking methods used in magneto-optical disc apparatuses, there are known the continuous servo tracking method and the sample servo tracking method. As compared with the continuous servo tracking method, the sample servo tracking method has the following merits:

(1) it can effect tracking control having less error; and (2) it can effect differential detection binarization by the use of a differential detection code such as 4/15 code and can, therefore, effect more highly accurate binarization of a reproduction signal.

However, the sample servo tracking method also has the following demerits:

(3) much time is required for access; and (4) the limit in a disc format becomes great.

At present, the continuous servo tracking method is used more in rewriting type optical disc apparatuses.

Now, FIG. 1 of the accompanying drawings shows an example of the disc format in the sample servo tracking method. In FIG. 1, a sector is comprised of 43 segments each comprising 18 bytes, and a servo byte as shown in FIG. 2 of the accompanying drawings is always preformated in the first two bytes of each segment. A staggered mark is provided in the first half (servo byte No. 1) of the servo byte of FIG. 2, and a synchronous mark (clock pit) for PLL is provided in the second half (servo byte No. 2). Such a synchronous mark is provided in each segment and therefore, if PLL is synchronized with this, a clock for data reading-out can be obtained.

The address field and data field of FIG. 1 are recorded by 4/15 code. This 4/15 code is a differential detecting code and has such a low code that can convert 1 byte into 15 bits and make 4 bits of 15 bits into "1" and make the remainder into "0". In a differential detection reproduction method, data is A/D-converted fifteen times with respect to a byte by this technique by the use of a PLL clock, and of the fifteen samples thus obtained, four locations greater in value are judged as "1" and the remaining eleven locations are judged as "0", whereby the reproduction of the data is effected. In such a differential detection reproduction method, the level values at each point of time of sampling are relatively compared to thereby judge "1" or "0" and therefore, the influence of the error of the fluctuation of the low frequency of a reproduction signal becomes small and more accurate binarization of the reproduction signal can be accomplished.

The partial response recording method effective for high density recording will now be briefly described. In an ordinary optical disc apparatus, the reproduction resolving power is determined by the wavelength of a reading-out semiconductor laser and the limit of a reading optical system, and when a pattern recorded at a density higher than that has been reproduced, adjacent pits cause waveform interference and therefore, it becomes impossible to read the signals. The partial response recording method is a recording method which is intentionally designed such that a signal subjected to recording, reproduction and waveform equalization becomes a waveform interference pattern of a predetermined characteristic, and multivalue-detects the signal and further eliminates an interference component to thereby obtain the original recording signal.

As an example, the encoding and decoding of a partial response (PR) (1,2,1) will hereinafter be described with reference to FIGS. 3A, 3B, 4 and 5 of the accompanying drawings. First, PR (1,2,1) effects waveform equalization so that as shown in FIG. 3A, "1" of 1 bit in a recording signal may be subjected to recording, reproduction and waveform equalization, whereafter it may become a pattern of 1, 2, 1 as shown in FIG. 3B.

FIG. 4 schematically shows the construction of a recording-reproducing apparatus using PR (1,2,1), and FIG. 5 shows the signals of the respective portions of FIG. 4. It is to be understood first that recording data "01100101000" as shown at (a) in FIG. 5 has been inputted to a precoder circuit 31. In the precoder circuit 31, when the recording data is inputted thereto, NRZI conversion is effected twice as shown at (b) and (c) in FIG. 5, and a recording signal as shown at (c) in FIG. 5 is outputted. This recording signal becomes a waveform interference pattern after it passes through recording means 32, a disc 33, reproducing means 34 and waveform equalizing means 35, and when it is made into a quinary signal by n value detection means 36, it becomes a quinary level digital signal of 0, 1, 2, 3, 4 as shown at (e) in FIG. 5. In binarizing means 37, "0", "2" and "4" of the quinary signal are regarded as "0" and "1" and "3" are regarded as "1", and a binarized signal as shown at (f) in FIG. 5 is outputted. Of course, the reproduction signal thus obtained coincides with the original recording data shown at (a) in FIG. 5.

As another example, the encoding and decoding of PR (1,1) will now be described with reference to FIGS. 6A, 6B and 7 of the accompanying drawings and FIG. 4. First, PR (1,1) effects waveform equalization so that as shown in FIG. 6A, "1" of 1 bit in the recording signal may pass through the recording means, the reproducing means and the waveform equalizing means, whereafter it may become a pattern of 0, 1, 1, 0 as shown in FIG. 6B. In PR (1,1), the signals of the respective portions of FIG. 4 become such as shown in FIG. 7, and in the precoder circuit 31 of FIG. 4, when recording data shown at (a) in FIG. 7 is inputted thereto, NRZI conversion is effected once for the recording data, and a recording signal as shown at (c) in FIG. 7 is outputted. Also, in the n value detection means 36, ternary detection of 0, 1, 2 is effected and a ternary level digital signal as shown at (e) in FIG. 7 is outputted, and in the binarizing means 37, "0" and "2" are regarded as "0" and "1" is regarded as "1" and a binarized signal as shown at (f) in FIG. 7 is outputted. The selection of whether use should be made of PR (1,1) or PR (1,2,1) as described above is determined with the recording-reproducing characteristic, the degree of difficulty of n value detection and the complicatedness of the circuit taken into account.

FIG. 8 of the accompanying drawings is a block diagram showing a popular information recording-reproducing apparatus utilizing partial response maximum likelihood. In FIG. 8, recording data is encoded into (8–9) code or (1,7) code by a recording encoding circuit 41. Also, the code is modulated into a signal suitable for partial response by a precoder 42, and this signal is recorded on a recording medium 44 by recording means 43. The precoder 42 is modulating means for suppressing the propagation of an error during decoding, and is conventional means in the partial response method. In a clock pit extracting circuit 47, a signal corresponding to the clock pit described with reference to FIG. 2 is extracted from a reproduction signal obtained by reproducing means 45 and is inputted to a PLL circuit 48.

On the other hand, the reproduction signal obtained by the reproducing means 45 is made into a signal having a predetermined waveform interference characteristic by a waveform equalizing circuit 46 and is inputted to an AD converter 49. In the AD converter 49, data is digitally read in accordance with a synchronous clock produced by the PLL circuit 48, and in a maximum likelihood circuit 50, the obtained reproduction signal data is analyzed and as a result, an input signal of the highest possibility is presumed. The maximum likelihood is a known decoding method of decoding a signal by the use of a Viterbi algorithm or the like so that the error may become smallest, as described in the Sep. 30, 1991, issue of Nikkei Electronics, p. 315. In a decoding circuit 51, the reverse conversion of the precoder 42 and the reverse conversion of the recording encoding circuit 41 are effected, whereby the decoding of the data is effected.

Now, as described above, multivalue detection by partial response and multivalue detection by the multivalue recording method are means effective for enhancing the recording density, but have suffered from the problem that the setting of a threshold value is difficult. This problem will now be described with reference to FIGS. 9A and 9B of the accompanying drawings. It is to be understood here that the reproduction signal has become a sine wave with the high frequency component thereof canceled by the elimination of the band and high frequency noise of the apparatus. In the case of binary detection, a threshold value is set at the center in order to judge the maximum and minimum of the sine wave as "1" and "0", respectively. The inclination at which the signal crosses the threshold value at this time is $\Delta x/\Delta t = -1$ as shown in FIG. 9A. On the other hand, in ternary detection as well, if the reduction signal is the same sine wave, it is necessary to judge the maximum value, the minimum value and the median thereof as "2", "0" and "0", respectively, and it is ideal to set the threshold value to the center of each point, i.e., the level of ±0.5. The inclination at which the sine wave signal crosses the threshold value at this time is $\Delta x/\Delta t = -\sqrt{3}/2$ as shown in FIG. 9B. That is, the inclination becomes gentler by 15.5% than in binary detection.

However, when in FIGS. 9A and 9B, low frequency noise of equal level occurs at the threshold value, jitter is more aggravated by 15.5% in the ternary detection of FIG. 9B than in the binary detection of FIG. 9A. The foregoing is the description of the case of ternary detection, but in the case of quinary detection, low frequency noise jitter is further aggravated. Accordingly, the setting of such a threshold value that can cancel low frequency noise, or in other words, can momentarily respond to the fluctuation of the DC level, is desired. However, when a low frequency component is included in the recording signal component itself, it has been impossible to reproduce it.

Next, in the prior art continuous servo format method, a PLL circuit is synchronized with a modulation signal itself by the use of (1,7) code or (2,7) code which is a PLL (run length limited) code, whereby a synchronous clock is produced and therefore, nothing like the clock pit in the sample servo method is present. Conversely, however, the technique of AD-converting a reproduction signal and digitally signal-processing it as in differential detection has been difficult because no clock pit is present.

It would also occur to mind to unite the high density technique by the partial response recording-reproducing method and the high reliability technique by the differential detection code recording-reproducing method with each other and make the most of the merits of the two, but in such a case, how recording and reproduction can be done has heretofore been indistinct.

Further, in the prior art, the sample servo method has suffered from the following three problems.

(1) In the sample servo method, a phase error inevitably occurs between the clock pit of the preformat portion recorded from first and a data portion recorded later with that clock pit as the reference. Such a phase error has been difficult to compensate for accurately and the left phase error has been a factor of data misreproduction.

(2) As can be seen from the format of FIG. 1, in the sample servo method, two of 18 bytes are used as servo bytes even in the data area and therefore, when viewed from the viewpoint of data capacity, this format could not be said to be an efficient format.

(3) As shown in FIG. 1, the sample servo method requires a complicated preformat and therefore, suffers from the problem that it is difficult to keep interchangeability with different kinds of discs. If nothing is initially written as in the presently commercially available floppy discs, the drive for any kind of apparatus will become capable of being used by a disc being formatted, but it has been difficult in the sample servo method.

SUMMARY OF THE INVENTION

The present invention has been made in view of the above-noted problems peculiar to the prior art and an object thereof is to provide an information recording apparatus and an information reproducing apparatus which solve the problem of a threshold value in the multivalue detection of a reproduction signal and are capable of effecting the stable detection of a multivalue level.

A further object of the present invention is to provide an information recording-reproducing apparatus which periodically records a clock edge pattern on an information recording medium, extracts it during reproduction and samples a reproduction signal on the basis thereof, thereby being capable of effecting various complicated reproduction signal processings in the continuous servo method.

Still a further object of the present invention is to provide an information recording apparatus, an information reproducing apparatus and an information recording-reproducing apparatus of high density and high reliability in which the high density technique of the partial response recording type and the high reliability technique of the differential detection type are united together.

The above objects are achieved by an information recording-reproducing apparatus for recording and/or reproducing data on an information recording medium, provided with:

means for reproducing said data recorded on said recording medium by the utilization of partial response; and means for modulating and recording said data for each predetermined block so that during waveform equalization in said partial response, the number of a plurality of level values present in L samples corresponding to one block of said data may become constant in each block.

Also, the above objects are achieved by said information recording-reproducing apparatus wherein said reproducing means is provided with:

means for detecting a reproduction signal corresponding to said data from said recording medium;

means for waveform-equalizing said reproduction signal;

means for sampling said reproduction signal after said waveform equalization at a predetermined period;

means for comparing the levels of sample values for each of said L samples;

means for making said reproduction signal into a multivalue on the basis of the result of the comparison by said comparing means; and means for converting said reproduction signal made into a multivalue into said data.

Also, the above objects are achieved by an information recording-reproducing apparatus for recording and/or reproducing data on/from an information recording medium, provided with:

means for reproducing said data recorded on said recording medium by the utilization of partial response; and means for modulating and recording said data so that during waveform equalization in said partial response, at least one sample at each of the highest level and the lowest value may be present in L samples corresponding to one block of said data.

Also, the above objects are achieved by said information recording-reproducing apparatus wherein said reproducing means is provided with:

means for detecting a reproduction signal corresponding to said data from said recording medium;

means for waveform-equalizing said reproduction signal;

means for making said reproduction signal after said waveform equalization into a multivalue on the basis of a predetermined threshold value;

means for converting said reproduction signal made into a multivalue into said data; and means for detecting the highest level and the lowest level of said reproduction signal and producing said threshold value signal on the basis of said detected highest and lowest levels.

Also, the above objects are achieved by an information recording-reproducing apparatus for recording and/or reproducing data on/from an information recording medium, provided with:

means for reproducing said data recorded on said recording medium by the utilization of partial response; and means for encoding said data by an encoding law so that the number of "1" in each predetermined block of said data after encoding applied to said partial response may become constant, and recording the encoded data on said recording medium.

Also, the above objects are achieved by said information recording-reproducing apparatus wherein said reproducing means is provided with:

means for detecting a reproduction signal corresponding to said data from said recording medium;

means for waveform-equalizing said reproduction signal;

means for making said reproduction signal after said waveform equalization into a multivalue on the basis of a predetermined threshold value;

means for converting said reproduction signal made into a multivalue into said data; and means for adjusting said threshold value signal so that the sum total of the level values of said reproduction signal made into a multivalue in each said predetermined block may become constant.

Also, the above objects are achieved by an information recording-reproducing apparatus for recording and/or reproducing data on/from an information recording medium, provided with:

means for recording a clock edge pattern for periodic clock reproduction on said recording medium;

means for detecting a reproduction signal from said recording medium;

means for extracting said clock edge pattern from said reproduction signal;

means for producing a reproduction clock signal on the basis of said extracted clock edge pattern; and means for producing said data from said reproduction signal by the use of said reproduction clock signal.

BRIEF DESCRIPTION OF THE DRAWINGS

FIGS. 3A and 3B are graphs for illustrating partial response PR (1, 2, 1).

FIG. 5 shows the signals of the respective portions of FIG. 4.

FIGS. 6A and 6B are graphs for illustrating partial response (1, 1).

FIG. 7 shows the signals of the respective portions of the apparatus of FIG. 4 in the case of PR (1, 1).

FIG. 12 shows a recording code conversion table used for the encoding and decoding of the recording data in the FIGS. 10A and 10B embodiment.

FIG. 13 shows a recording code conversion table used for the encoding and decoding of the recording data in the FIGS. 10A and 10B embodiment.

FIG. 14 shows a recording code conversion table used for the encoding and decoding of the recording data in the FIGS. 10A and 10B embodiment.

FIG. 16 illustrates a clock edge pattern which is not subjected to waveform interference in the case of PR (1, 1).

FIG. 17 shows a clock edge pattern when the clock edge pattern of FIG. 16 is applied to the embodiment of FIGS. 10A and 10B.

FIG. 18 is a diagram showing the specific construction of a double differentiation circuit in the embodiment of FIGS. 10A and 10B.

FIG. 19 illustrates the operations of the double differentiation circuit and a clock edge extracting circuit in the embodiment of FIGS. 10A and 10B.

FIG. 20 illustrates a clock edge pattern which is not subjected to waveform interference in the case of PR (1, 2, 1).

FIG. 22 shows a recording code conversion table used in the case of PR (1, 1) in another embodiment of the present invention.

FIG. 23 shows a recording code conversion table used in the case of PR (1, 1) in another embodiment of the present invention.

FIG. 24 shows a recording code conversion table used in the case of PR (1, 1) in another embodiment of the present invention.

FIG. 26 shows a recording code conversion table used in the case of PR (1, 2, 1) in another embodiment of the present invention.

FIG. 27 shows a recording code conversion table in the case of PR (1, 2, 1) in another embodiment of the present invention.

FIG. 28 shows a recording code conversion table in the case of PR (1, 2, 1) in another embodiment of the present invention.

FIG. 29 shows a recording code conversion table used in the case of PR (1, 2, 1) in another embodiment of the present invention.

DESCRIPTION OF THE PREFERRED EMBODIMENTS

Figure 10B:
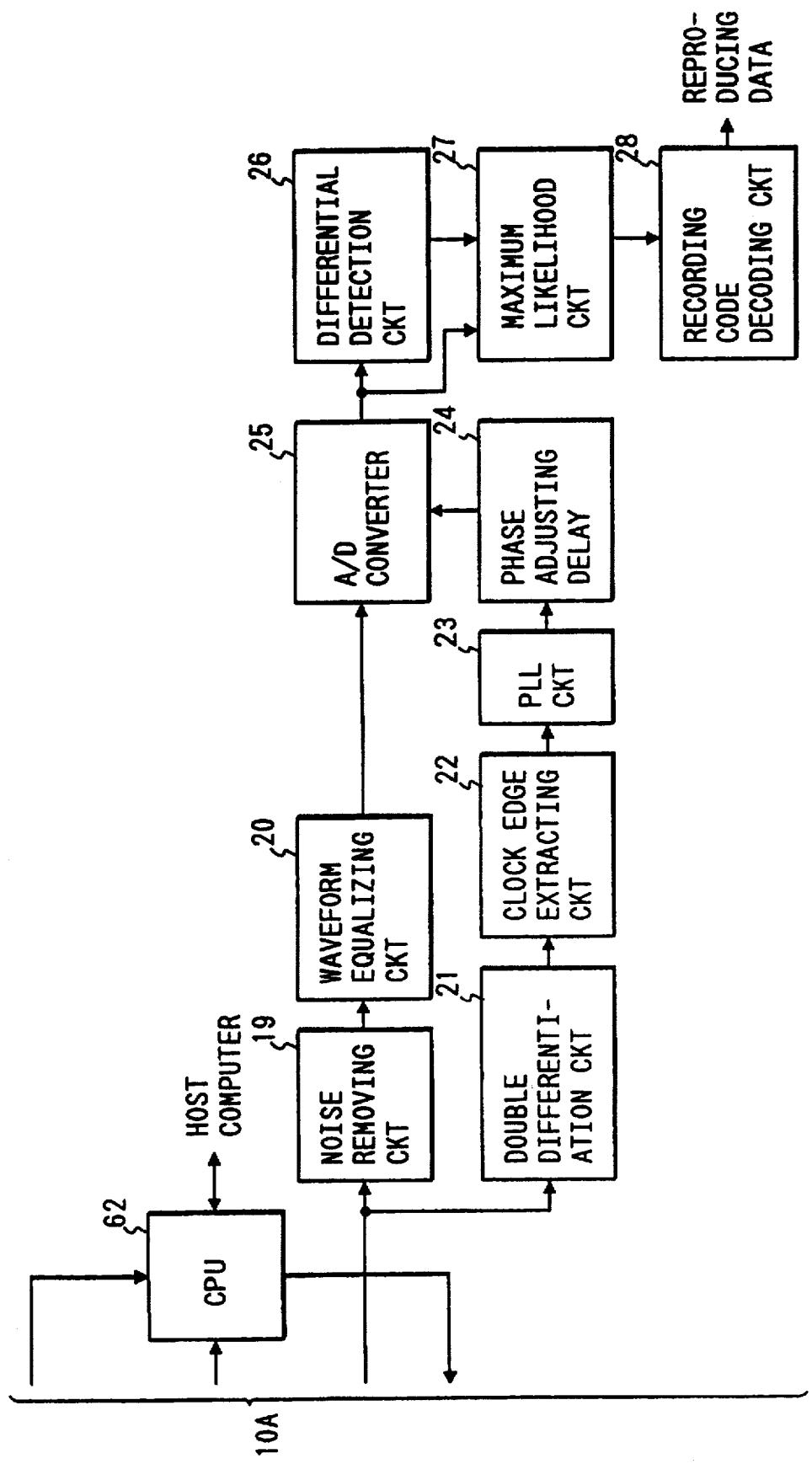
FIG. 10, which is comprised of FIGS. 10A and 10B, is a block diagram showing an embodiment of the present invention.

Some embodiments of the present invention will hereinafter be described in detail with reference to the drawings. In FIGS. 10A and 10B, a magneto-optical disc apparatus is shown as an example. In FIGS. 10A and 10B, recording data is inputted to a recording encoding circuit 1 and is encoded in each predetermined block. The encoding method of this encoding circuit 1 will be described later in detail. The encoded signal is sent to recording means 3, and in the recording means 3, the magnetic field of a magnetic head 9 is modulated or the light intensity of a semiconductor laser 4 is modulated, whereby information is recorded on a magneto-optical disc 8. Recording by modulating the magnetic field of the magnetic head 9 is called the magnetic field modulation method, and recording by modulating the light intensity of the semiconductor laser 4 is called the light modulation method. A beam of light emitted from the semiconductor laser 4 passes through a collimator lens 5 and a polarizing beam splitter 6 and enters an objective lens 7. The beam of light is then condensed by the objective lens 7 and is applied as a micro light spot to a magneto-optical disc 8.

The thus applied light spot is reflected by the surface of the disc and again passes through the objective lens 7 to the polarizing beam splitter 6, by which the light is reflected toward a beam splitter 10. In the beam splitter 10, the incident light is divided into two lights, one of which is directed to a half wavelength plate 11 and the other is directed to a divided light sensor 29. In a servo circuit 30, there are obtained a focusing error signal and a tracking error signal for controlling focusing and tracking by the use of a signal detected by the divided light sensor 29, and these signals are outputted to a focusing/tracking control circuit 61. In the focusing/tracking control circuit 61, focusing control and tracking control are effected with the objective lens 7 being displaced in focusing and tracking directions on the basis of error signals obtained.

On the other hand, the beam of light passing through the half wavelength plate 11 is further divided into two lights by a polarizing beam splitter 12, and these divided lights are received by a photosensor 13 and a photosensor 14. The detection signals of the two photosensors 13 and 14 are added together by an adding amplifier 15, and in an address reproducing circuit 16, prepit information preformated on the magneto-optical disc 8 by unevenness is reproduced from the addition signal. The prepit information read by the address reproducing circuit 16 is sent to accessing means 17, in which address information indicated by a CPU 62 or a host computer is compared with the prepit information and a recording-reproducing head is moved to the indicated address. Also, in a differential amplifier 18, the detection signals of the photosensors 13 and 14 are differentially detected, whereby recording information is reproduced as a magneto-optical signal. What has been described above is a generally known magneto-optical recording-reproducing process.

Next, a reproduction signal obtained in the differential amplifier 18 is sent to a double differentiation circuit 21, in which double differentiation is effected, whereby a relatively sharp edge portion is detected. Also, in a clock edge extracting circuit 22, the edge portion of this edge detection signal which is periodically recorded with a predetermined pattern is extracted and is outputted to a PLL circuit 23. In the PLL circuit 23, a clock synchronized with the clock edge is produced on the basis of a clock edge extraction signal. In a phase adjusting delay 24, the phase of a synchronous clock produced is delayed by a predetermined time and phase adjustment to a phase suitable as the clock of an A/D converter 25 is effected.

On the other hand, in a noise removing circuit 19, the noise of the reproduction signal is removed, and this reproduction obtains a necessary waveform interference characteristic by a waveform equalizing circuit 20, whereafter it is converted into a digital reproduction signal by the A/D converter 25. In a differential detection circuit 26, differential detection decoding is effected by the use of the obtained digital reproduction signal. This method will be described later in detail. Further, in a maximum likelihood circuit 27, the correction of the error of the reproduction signal is effected by the use of a Viterbi algorithm, and in a recording code decoding circuit 28, decoding is effected by the use of the corrected signal, whereby the same reproduction data as the data recorded at first is outputted.

Figure 11:
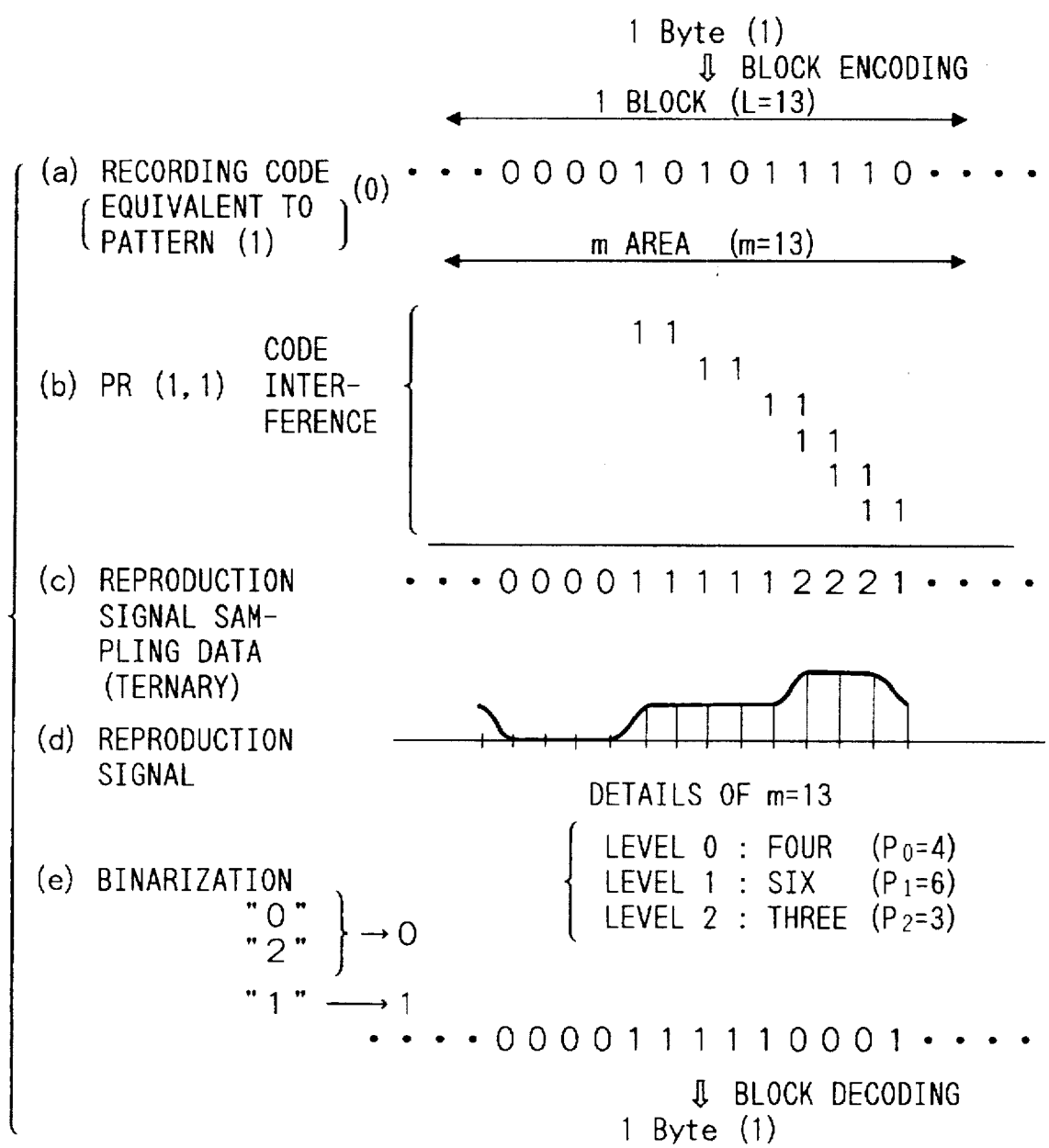
FIG. 11 illustrates the encoding and reproducing operations of the FIGS. 10A and 10B embodiment for recording data.

The operations of the respective portions of the FIGS. 10A and 10B embodiment will now be specifically described. In FIG. 11, there are shown the inputs and outputs of the recording encoding circuit 1 and the A/D converter 25 of FIGS. 10B. In the recording encoding circuit 1, when recording data of 1 byte, i.e., 8 bits, is inputted thereto, those 8 bits are converted, for example, into data of 13 bits "0000101011110" as shown at (a) in FIG. 11. A recording code conversion table for encoding the recording data is provided within the recording encoding circuit 1, and on the basis of this conversion table, conversion into a recording code of 13 bits is effected in each block of the recording data. That is, the recording encoding circuit 1 has a recording code conversion table for converting one block of the recording data into the recording codes of column (a) in FIGS. 12 to 14, and for example, when the 1 byte information of the recording data is byte data (1), block conversion in which "0000101011110" in the first line of column (a) in FIG. 12 is selected is effected in the recording encoding circuit 1. Here, the area of the converted 13 bits is defined as m area.

When the thus converted recording code is subjected to code interference of PR (1, 1) characteristic, the portion "1" of the recording code becomes "1, 1" as shown at (b) in FIG. 11 and interferes with the adjacent bit. As a result, the reproduction signal assumes a form as shown at (d) in FIG. 11, and when it is sampled at a predetermined period by the A/D converter 25, the data becomes 13 samples of ternary data "0", "1", "2" as shown at (c) in FIG. 11. Of this ternary data of 13 samples, the level 0 is four, the level 1 is six and the level 2 is three. These numerical values always become so when use is made of the codes of column (a) in the recording code conversion tables of FIGS. 12 to 14. In other words, as regards the codes of column (a) in FIGS. 12 to 14, of the ternary data after PR (1, 1) interference, only those of which the level 0 becomes four, the level 1 becomes six and the level 2 becomes 3 are extracted from among $10^{13}$ 13-bit data.

Here, for ease of discussion, it is to be understood that the bit immediately before this block is "0". Also, 350 data extracted from among $10^{13}$ data all satisfy this condition, but in these 350 data, the last bit is "0" as can be seen from column (a) in FIGS. 12 to 14. This is convenient for connecting this block code. That is, the head bit of the reproduction signal sample data is affected by whether the bit before it is "0" or "1". Accordingly, if an attempt is made to effect reproduction by the use of the 13 samples of the reproduction signal sample data, it is necessary to fix the most recent prior bit to "0" or "1". Regarding this point, in the present embodiment, all the last ones of the codes of FIGS. 12 to 14 are "0" and therefore, the blocks can be directly connected together.

Also, in the case of other conditions than the condition shown by way of example, a bit for preventing the interference between adjacent blocks may become necessary between the adjacent blocks. In such a case, m>L. Further, in FIGS. 12 to 14, the combination of the byte data and 350 recording codes may be any combination. That is, since 1 byte includes 256 codes, it is desirable to combine them so that encoding or decoding can be done efficiently.

On the other hand, during reproduction, the data obtained by the reproduction signal of (d) in FIG. 11 having been A/D-converted by the A/D converter 25, i.e., the data of (c) in FIG. 11, is inputted to the differential detection circuit 26 of FIG. 10B. In the differential detection circuit 26, in order of higher samples of the data of 13 samples inputted, three samples are judged as "2", and in the order of lower samples, four samples are judged as "0", and the remaining six samples are judged as "1". With regard to the thus obtained ternary signal of one block, the correction of an error is effected by the maximum likelihood process in the maximum likelihood circuit 27. In this case, the ternary signal is binarized in such a fashion that "0" and "2" are "0" and "1" is "1".

The binarized 13 bits become "0000111110001" as shown at (e) in FIG. 11, and are sent to the recording code decoding circuit 28. A code conversion table for converting the inputted 13 bits is provided within the recording code decoding circuit 28, and on the basis of this table, the process of decoding the 13 bits into the original recording data is carried out. That is, the recording code decoding circuit 28, having a conversion table for converting column (b) in FIGS. 12 to 14 into column (a), refers to this to thereby seek the input data in column (b) in FIGS. 12 to 14, and converts it into the recording codes of column (a) corresponding thereto, whereby reproduction data is outputted. If, in this case, 13 bits are the input data "0000111110001" as previously described, this is the first line in column (b) in FIG. 12 and therefore, "0000101011110" in column (a) corresponding thereto is outputted as reproduction data. Column (b) in the code conversion tables of FIGS. 12 to 14 is the exclusive logical sum of adjacent bits in column (a), and conversely, column (a) is the result of column (b) having been NRZI-converted.

Figure 15:
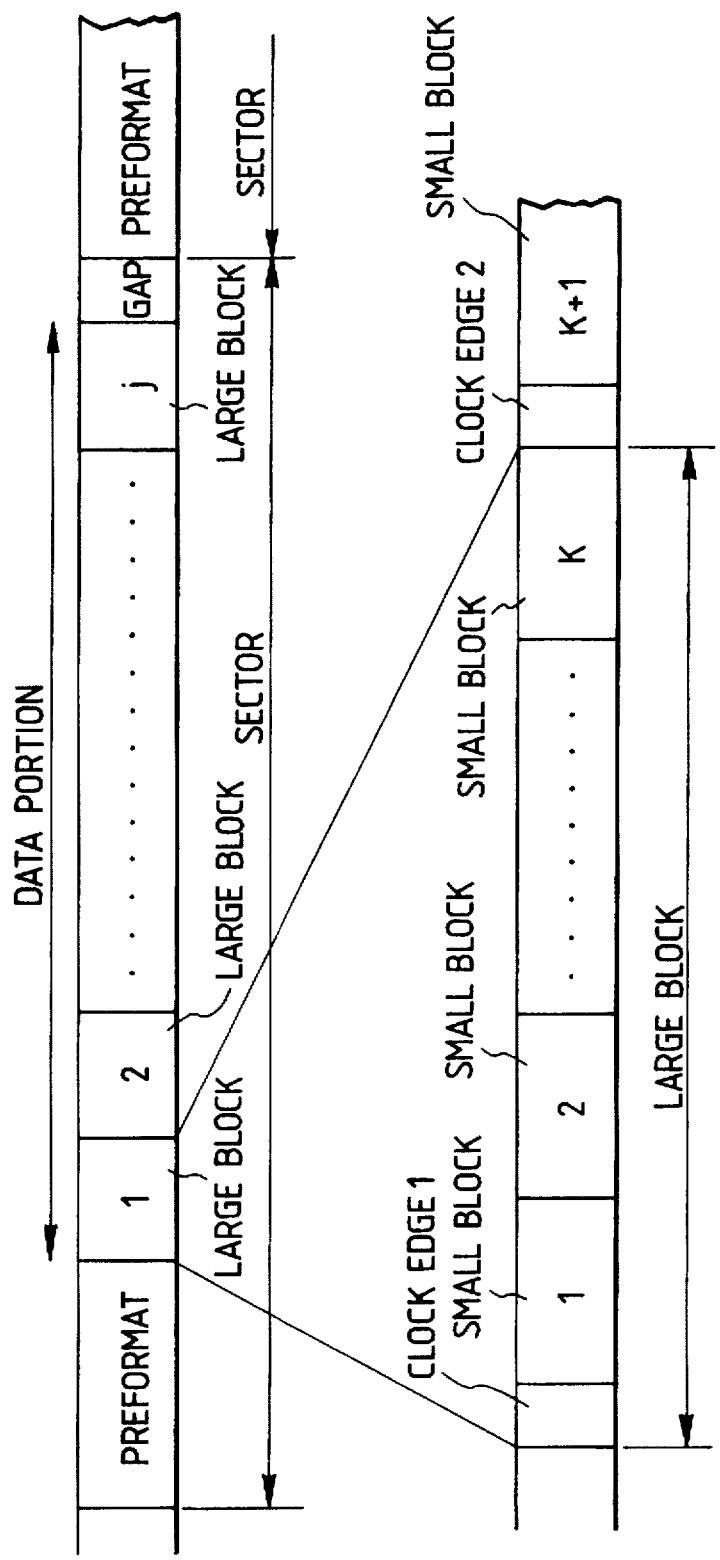
FIG. 15 shows the format of a magneto-optical disc in the FIGS. 10A and 10B embodiment.

Description will now be made of a synchronizing method in the information reproducing portion of the FIGS. 10A and 10B embodiment. FIG. 15 shows an example of the format of the magneto-optical disc 8. In FIG. 15, a sector comprises a preformat portion in which an address has been recorded from first and the remaining data portion which comprises j large blocks. A clock edge for synchronizing PLL is provided at the head of the large blocks. Except the clock edge, each large block is divided into k small blocks, and the previously described recording encoding and differential detection are effected at this small block unit. A pattern which is not subjected to waveform interference from the signals before and after it is adopted as the clock edge.

The pattern which is not subjected to waveform interference refers to a pattern as shown in FIG. 16. That is, in the case of PR (1, 1), when as a code pattern, a 4-bit pattern "0010" as shown at (a) in FIG. 16 is NRZI-converted by a precoder and is recorded by a signal of "0011" as shown at (b) in FIG. 16, the reproduction signal becomes a clock edge pattern "012" as shown at (c) in FIG. 16. Accordingly, in the case of PR (1, 1), if recording is effected in the code pattern "0010", the reproduction signal will always become "012" and therefore, the clock edge pattern can be detected without being subjected to waveform interference. When this way of thinking is applied to the apparatus of the FIGS. 10A and 10B embodiment, the condition that the last bit of the recording signal must be "0" is added and therefore, as the code pattern, 1 bit is increased from 4 bits, and the code pattern becomes a 5-bit pattern "00110" as shown in FIG. 17. In FIG. 16, however, this corresponds to the signal after NRZI conversion.

This clock edge is extracted by the double differentiation circuit 21 of Figure 10B. The double differentiation circuit 21, if shown in a simplified form, assumes a construction as shown in FIG. 18 wherein two differentiation circuits are series-connected to each other. When the reproduction signal is differentiated twice by this double differentiation circuit 21, the clock edge is emphasized as shown in FIG. 19 and therefore, the edge can be extracted. The signal having its clock edge portion thus emphasized is outputted to the clock edge extracting circuit 22. In the clock edge extracting circuit 22, a right clock edge alone is extracted by the technique of binarizing the signal at a zero cross point, and further eliminating any other portion than a known clock edge, for example, a method of opening a gate for only an area in which the appearance of the clock edge is expected with the signal of the preformat as the reference. Then, the extracted signal is outputted to the PLL circuit 23, in which a synchronous clock is produced on the basis of that signal. As is apparent from FIG. 19, it is the feature of the present invention that edge detection portions and differential detection portions are alternately present in a sector.

The pattern which is not subjected to waveform interference has been described with respect to the case of PR (1, 1), but in the case of PR (1, 2, 1), it is as follows. When as the code pattern, a 6-bit pattern "000110" as shown at (a) in FIG. 20 is NRZI-converted twice by the precoder and is recorded by a signal as shown at (b) in FIG. 20, the reproduction signal becomes a clock edge pattern "0134" as shown at (c) in FIG. 20. Thus, again in this case, by the clock edge pattern being recorded by "000110", the reproduction signal always becomes "0134" and therefore, the clock edge pattern can be detected without being subjected to waveform interference.

Figure 1:
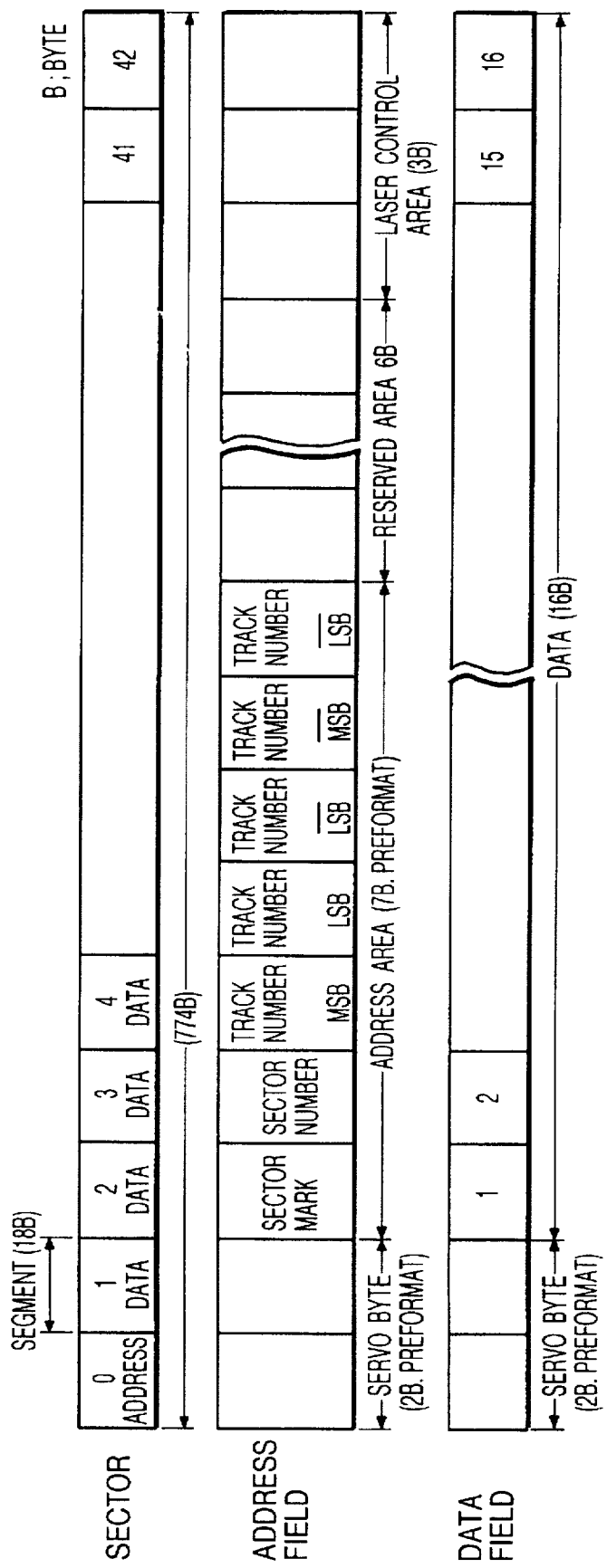
FIG. 1 shows an example of the format of a disc of the sample servo type.
Figure 2:
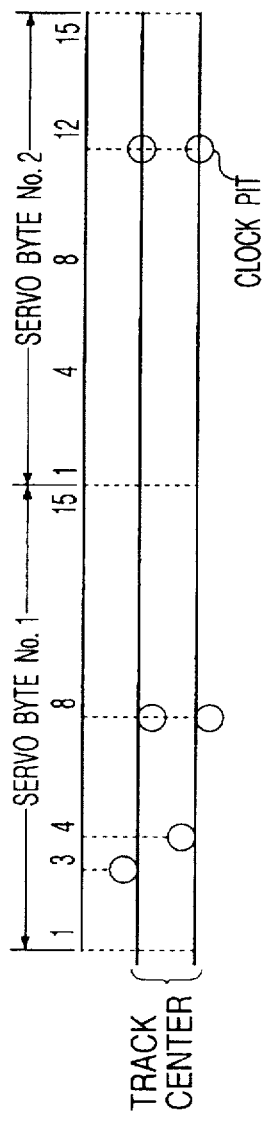
FIG. 2 enlargedly shows the servo byte of FIG. 1.
Figure 4:
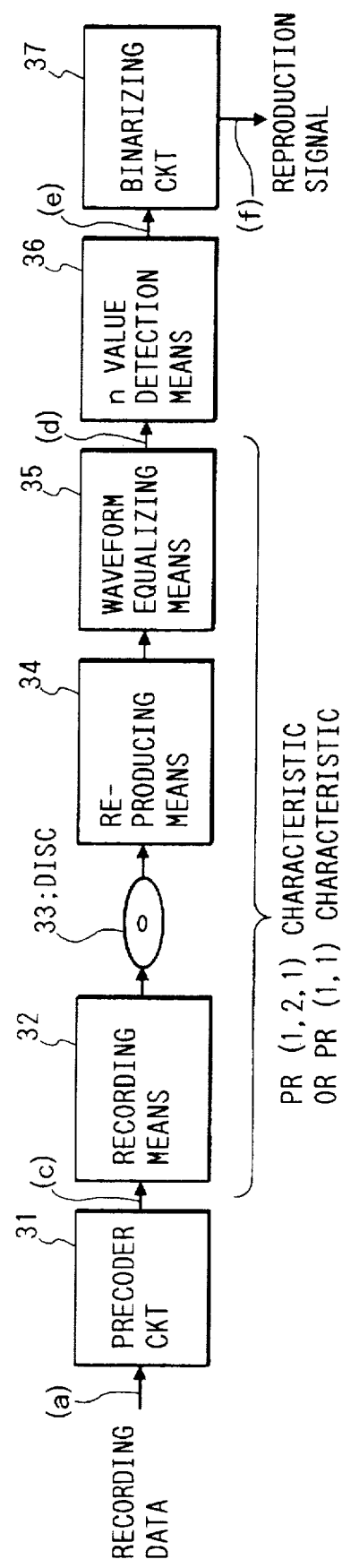
FIG. 4 is a block diagram schematically showing an information recording-reproducing apparatus using PR (1, 2, 1) according to the prior art.
Figure 8:
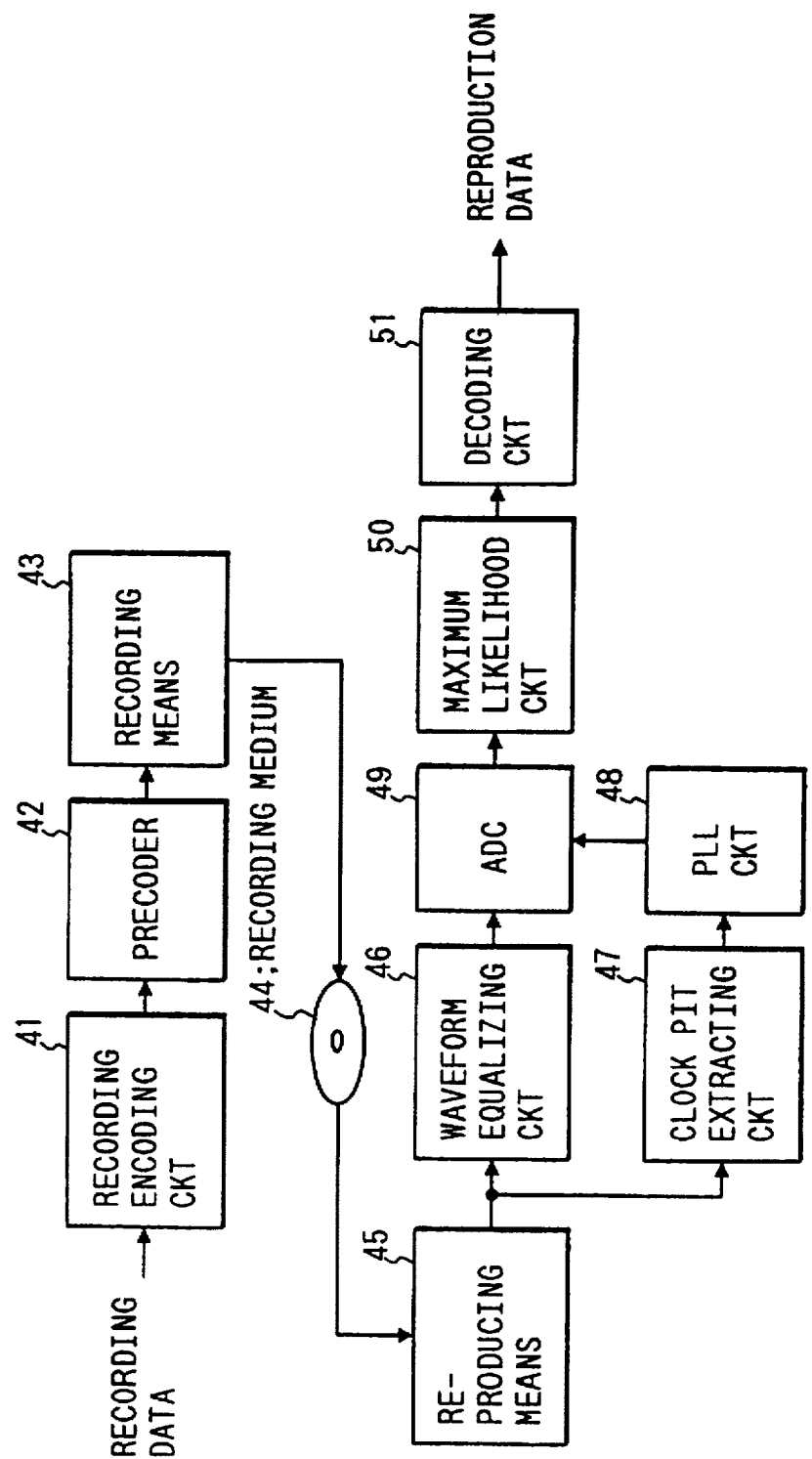
FIG. 8 is a block diagram of an information recording apparatus utilizing the partial response maximum likelihood.
Figure 9A:
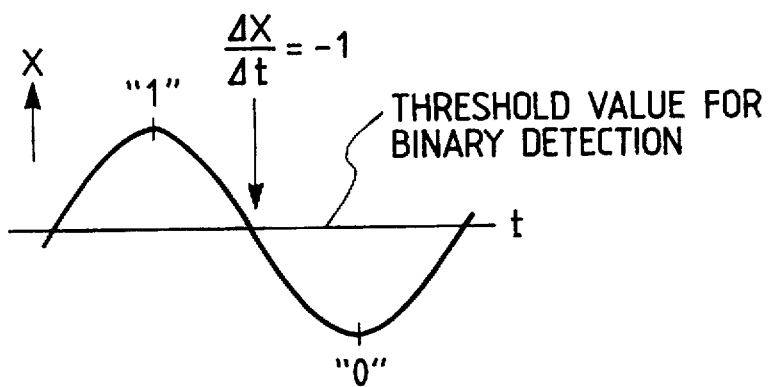
FIGS. 9A and 9B are graphs for illustrating the problem of a threshold value in a multivalue detecting circuit according to the prior art.
Figure 9B:
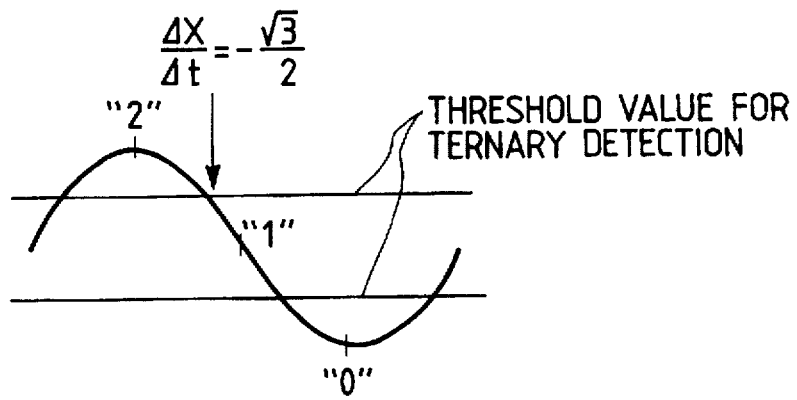
Figure 21:
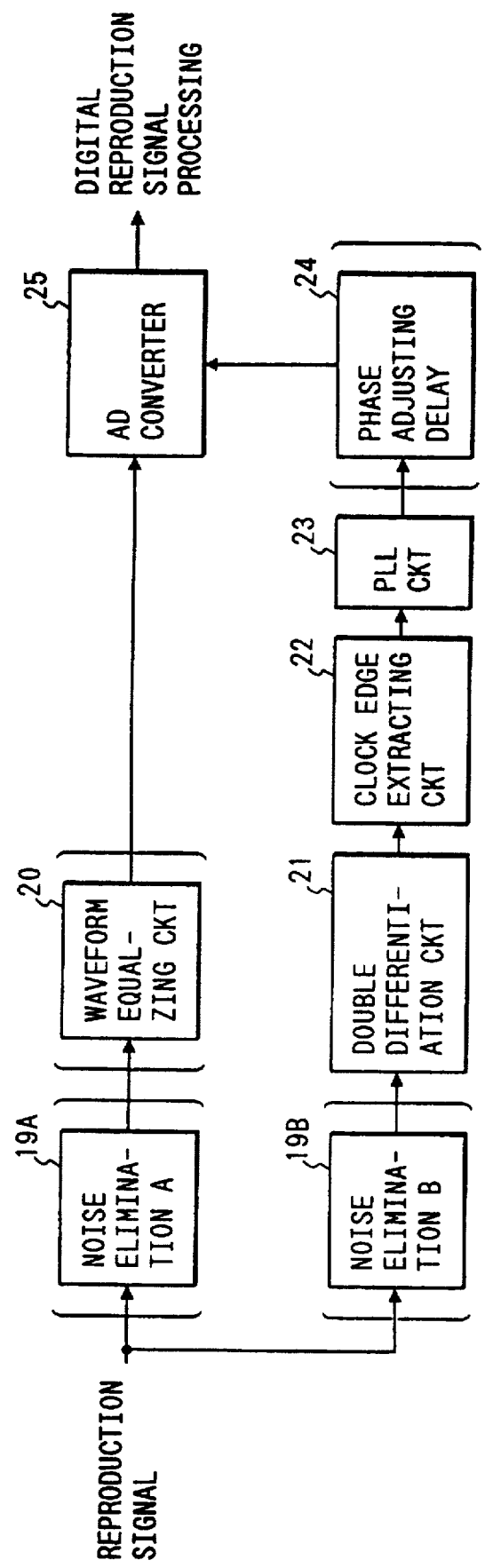
FIG. 21 shows the information reproducing portion of the FIGS. 10A and 10B embodiment.

FIG. 21 is a block diagram showing the information reproducing portion in the apparatus of FIGS. 10A and 10B. In FIG. 21, the reference characters 19A and 19B correspond to the noise removing circuit 19, and the other constituents are the same as those in FIGS. 10A and 10B. The difference of this information reproducing portion from the example of the prior art shown in FIG. 8 is that a double differentiation circuit 21 and a clock edge extracting circuit 22 are provided, and as previously described, the clock edge is extracted by these two circuits, and by the use of it, a synchronous clock is produced. Accordingly, by such a method, the clock edge used in the information reproducing portion of FIG. 21 can be made shorter than the clock bit in FIG. 8 and therefore, the information density efficiency of the recording medium can be improved.

As described above, in the present embodiment, during multivalue signal detection, an n value level is judged with higher levels of n levels being preferentially allotted to higher ones of m samples of the reproduction signal in each one block and therefore, it is not necessary to set a threshold value as in the prior art, and the problem in the threshold value setting method which has been most difficult in the multivalue detection of the reproduction signal can be solved. Accordingly, even if a DC level fluctuation or low frequency noise occurs to the reproduction signal or even if the irregularity of recording sensitivity or reproduction sensitivity occurs, multivalue level detection can be effected stably. When an n value level is to be judged, lower levels may be allotted to lower ones of m samples of the reproduction signal.

Also, when a clock edge is to be periodically recorded on the magneto-optical disc and data is to be reproduced, the edge is extracted and the reproduction signal is sampled by the use of a synchronous clock produced with the edge as the reference, whereby it becomes possible to carry out various complicated reproduction signal processings. Consequently, a recording-reproducing apparatus of high density and high reliability can be realized by combining excellent signal processing methods such as partial response, differential detection, waveform equalization, Viterbi decoding and multivalue recording.

Further, in the present embodiment, the high density technique of the partial response recording type and the high reliability technique of the differential detection type are united together to thereby solve the individual technical problems peculiar thereto and therefore, a specific recording-reproducing system of high density and high reliability can be realized. Also, in the present embodiment, a clock pit is not used, but a clock edge pattern is periodically recorded on the disc and during reproduction, the clock edge is extracted to thereby obtain a synchronous clock and therefore, it is possible to solve problems peculiar to the sample servo method, such as the data reproduction error by the phase error of the sample servo method, the data capacity of the medium and the problem of the interchangeability with different kinds of discs as previously described.

Another embodiment of the present invention will now be described. First, there is an example in which when recording data is to be converted into a recording code for each one block thereof, modulation is effected giving each one block the limitation that at least each one sample has the highest level and the lowest level of n value. FIGS. 22 to 24 are code conversion tables used at this time. In these code conversion tables, column (a) is 9 bits and column (b) is the result of column (a) having been NRZI-converted, and when recording is effected with the codes of column (b) and these codes are ternarized by the PR (1, 1) characteristic, all patterns in column (b) have all values of the ternary value. Among the 9 bits/512 patterns, it is the 336 patterns in FIGS. 22 to 24 that satisfy this condition.

Figure 25:
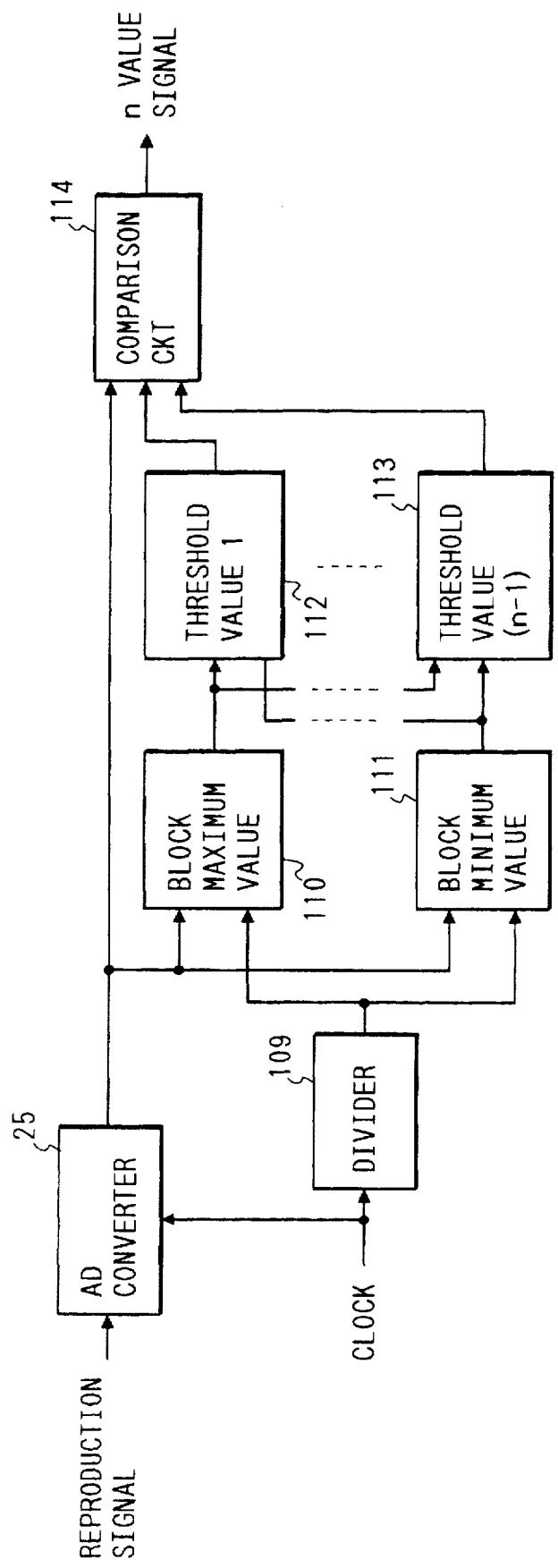
FIG. 25 shows an information reproducing apparatus according to another embodiment of the present invention.

The signal recorded in this manner is ternarized (n=3) by the reproducing circuit of FIG. 25. In FIG. 25, reference numeral 25 designates the AD converter of FIG. 10B, and reference numeral 109 denotes a divider which divides a clock and outputs a signal indicative of the length of 1 byte. Within a block, there are always a portion in which n=0 and a portion in which n=2 and therefore, the maximum value and the minimum value in each block are detected by a block maximum value detection circuit 110 and a block minimum value detection circuit 111, respectively, and in circuits 112 and 113 for setting threshold values, the threshold values of two portions are set on the basis of the detected values. In a comparison circuit 114, the ternary detection signal of the AD converter 25 is binarized by the set threshold values. In this manner, accurate multivalue detection is effected and the problem of threshold value setting in multivalue detection which has been peculiar to the prior art can be solved. A signal resulting from the ternary detection signal having been binarized is converted into the codes of column (a) by the use of the code conversion tables of FIGS. 22 to 24, whereby decoding is effected.

Next, this embodiment is one with respect to PR (1, 1), but in the case of PR (1, 2, 1), encoding is effected by the use of code conversion tables as shown in FIGS. 26 to 29. In these code conversion tables, column (a) shows 11-bit data and column (b) shows codes obtained by column (a) being NRZI-converted twice. So, when the codes of column (b) are recorded and are reproduced with PR (1, 2, 1) characteristic and are further quinary-detected, all levels from the level "0" to the level "4" always come to exist in a block. This signal is reproduced by the circuit in which n=5 in FIG. 25 is set, and the highest value and the lowest value are detected in a block. If four threshold values are then determined and the signal is made into a quinary signal, accurate multivalue detection can be effected as in the previous embodiment. Also, after multivalue detection, a binarized signal is converted into the codes of column (a) by the use of the code conversion tables of FIGS. 26 to 29, whereby decoding is effected. In the embodiment described with reference to FIGS. 10A, 10B and 11, there is also a method using PR (1, 2, 1) instead of PR (1, 1).

Figure 30:
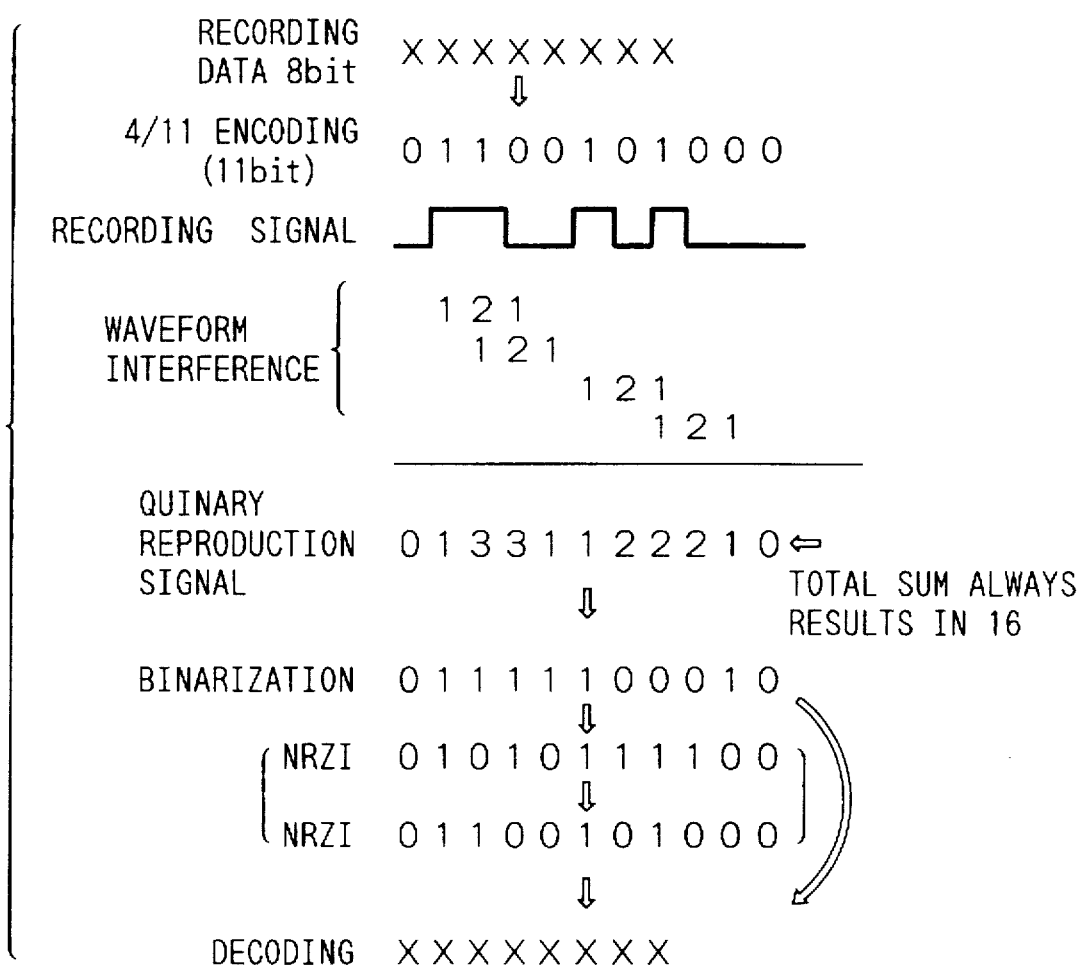
FIG. 30 illustrates the encoding and reproducing operations of still another embodiment of the present invention.
Figure 31:
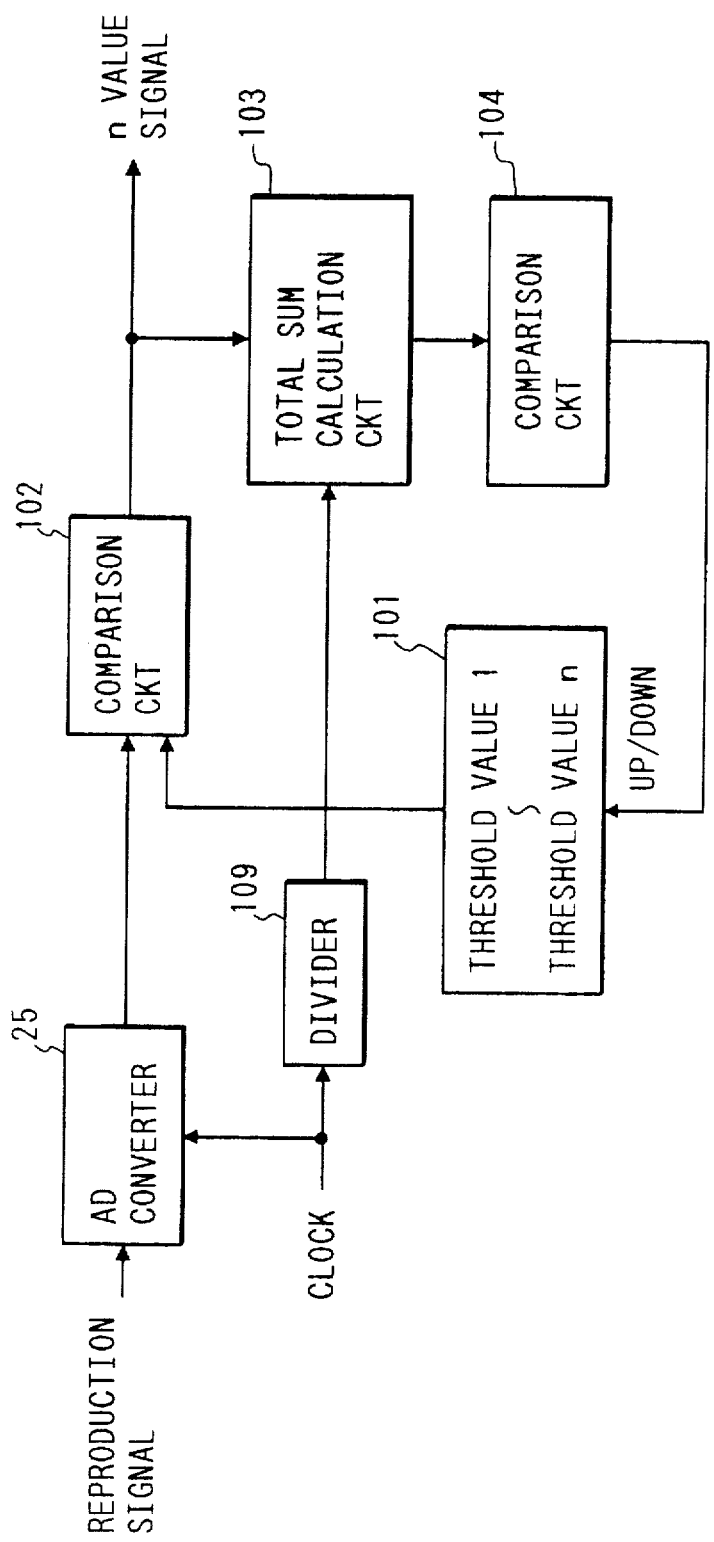
FIG. 31 is a block diagram showing an information reproducing apparatus according to still another embodiment corresponding to FIG. 30.

Next, there is also an example in which PR multivalue detection is effected by the use of a conventional differential detection code and the threshold value thereof is adjusted. That is, recording is effected by the existing 4/11 code, reproduction is effected with the PR (1, 2, 1) characteristic and further, quinary detection is effected. Such an embodiment will hereinafter be described with reference to FIGS. 30 and 31. First, in the case of 4/11 code, as shown in FIG. 30, "1" in the 11 bits of the recording code exists at four places and therefore, the sum total of the levels of a quinary reproduction signal is (1+2+1)×4=16 and thus, is always 16. So, by the utilization of this nature, reproduction is effected by the circuit of FIG. 31. In FIG. 31, a tentative threshold value is outputted in advance from a circuit 101 for setting four threshold values, and in accordance therewith, the reproduction signal is made into an n value in a comparison circuit 102. The sum total of the level values in each block is calculated in a total sum calculation circuit 103, and in a comparison circuit 104, the sum total obtained in the total sum calculation circuit 103 is compared with a predetermined value (in this case, "16"). In the comparison circuit 104, the threshold value of the threshold value setting circuit 101 is re-adjusted depending on whether the sum total is greater or smaller than 16.

In FIG. 30, mutual interference with the adjacent block is not taken into account, but yet if an attempt is made to avoid the influence of the adjacent block, it will be necessary to provide a buffer zone of 2 bits between the blocks. In the case of the circuit of FIG. 31, however, if design is made such that the calculation of the sum total is effected over a plurality of blocks and judgment is done by the average value thereof, it will be unnecessary to provide a buffer zone between the blocks.

Also, in the above-described embodiments, it is supposed that the multivalue detecting means uses partial response recording, whereas the present invention can be equally applied to a case where not partial response, but ordinary multivalue recording and multivalue reproduction are effected. Further, the format shown in FIG. 15 is an example preformated on the recording medium, but a method like a so-called floppy disc which is manufactured and sold without a preformat being recorded and which a user makes into a format by the use of a recording-reproducing apparatus would also occur to mind. In such a case, it is desirable that clock edges be distributed at equal intervals on the whole circumference. That is, if clock edges are distributed at equal intervals, the clock pit can be stably extracted and therefore, not only the reliability of reproduction can be improved, but also it becomes possible to keep interchangeability with other discs, irrespective of the format.

What is claimed is:

1. An information recording-reproducing apparatus for recording data on and/or reproducing data from an information recording medium, said apparatus comprising:

reproducing means for reproducing the data recorded on the recording medium by utilizing partial response; and means for encoding and recording the data for each predetermined block of data, so that after waveform equalization in the partial response, the number of each value of a plurality of level values present in L samples corresponding to one block of the data becomes constant in each blocks, wherein said reproducing means comprises means for detecting a reproduction signal corresponding to the data from the recording medium, means for waveform-equalizing the reproduction signal, means for sampling the reproduction signal after the waveform equalization at a predetermined period, comparing means for comparing the levels of sample values for every L samples and detecting the level values for every L samples, means for changing the reproduction signal into a multivalue on the basis of the result of the comparison by said comparing means, and means for converting the reproduction signal changed into a multivalue into the data.

2. An information recording-reproducing apparatus for recording data on and/or reproducing data from an information recording medium, said apparatus comprising:

reproducing means for reproducing the data recorded on the recording medium by utilizing partial response; and means for encoding the data so that the number of "1's " in each predetermined block of the data after encoding becomes constant, and for recording the encoded data on the recording medium, wherein said reproducing means comprises means for detecting a reproduction signal corresponding to the data from the recording medium, means for waveform-equalizing the reproduction signal, means for changing the reproduction signal after the waveform equalization into a multivalue on the basis of a predetermined threshold value, means for converting the reproduction signal made into a multivalue into the data, and means for adjusting the threshold value signal so that the sum total of the level values of the reproduction signal made into a multivalue in each of the predetermined blocks becomes constant.

* * * * *